United States Patent [19]
Nonobe et al.

[11] Patent Number: 5,929,594
[45] Date of Patent: Jul. 27, 1999

[54] FUEL-CELLS SYSTEM, ELECTRIC VEHICLE WITH FUEL-CELLS SYSTEM, AND METHOD OF CONTROLLING SUPPLY OF ELECTRIC POWER

[75] Inventors: Yasuhiro Nonobe, Aichi-ken; Yoshio Kimura, Okazaki; Yoshikazu Tohata, Aichi-ken, all of Japan

[73] Assignee: Toyota Jidosha Kabushiki Kaisha, Toyota, Japan

[21] Appl. No.: 08/911,049

[22] Filed: Aug. 14, 1997

[30] Foreign Application Priority Data

Aug. 29, 1996 [JP] Japan ................................ 8-249307

[51] Int. Cl.$^6$ .............................. H02J 7/00; B60K 1/00
[52] U.S. Cl. ......................... 320/104; 320/132; 320/136
[58] Field of Search ................... 320/104, 126, 320/128, 132, 134, 135, 136, DIG. 34

[56] References Cited

U.S. PATENT DOCUMENTS

| | | | |
|---|---|---|---|
| 4,961,151 | 10/1990 | Early et al. | 364/528.32 |
| 4,962,462 | 10/1990 | Fekete | 364/528.32 |
| 5,631,532 | 5/1997 | Azuma et al. | 320/102 |
| 5,808,448 | 9/1998 | Naito | 322/13 |
| 5,820,172 | 10/1998 | Brigham et al. | 290/40 C |
| 5,847,520 | 12/1998 | Theurillat et al. | 318/139 |

FOREIGN PATENT DOCUMENTS

| | | |
|---|---|---|
| 47-32321 | 11/1972 | Japan. |
| 6-124720 | 5/1994 | Japan. |

*Primary Examiner*—Peter S. Wong
*Assistant Examiner*—Gregory J. Toatley, Jr.
*Attorney, Agent, or Firm*—Oblon, Spivak, McClelland, Maier & Neustadt, P.C.

[57] ABSTRACT

In a fuel-cells system 10 including a stack of fuel cells 20 and a storage battery 30, the remaining charge of the storage battery 30 is measured by a remaining charge monitor 46. In case that the observed remaining charge of the storage battery 30 is less than a predetermined reference value, a control unit 50 outputs a driving signal to an inverter 80, in order to restrict the consumption of electric power by a motor 32. When it is determined that the output state of the storage battery 30 is in the discharging state, based on the output electric current of the storage battery 30 measured by a current sensor 90, the control unit 50 further limits the electric power consumed by the motor 32. These processes are repeatedly carried out to charge the storage battery 30 and recover the remaining charge of the storage battery 30 to a sufficient level.

16 Claims, 13 Drawing Sheets

FUEL-CELLS SYSTEM, ELECTRIC VEHICLE WITH FUEL-CELLS SYSTEM, AND METHOD OF CONTROLLING SUPPLY OF ELECTRIC POWER

BACKGROUND OF THE INVENTION

1. Field of the Invention

The present invention relates to a fuel-cells system, an electric vehicle with a fuel-cells system, and a method of controlling a supply of electric power. More specifically the present invention pertains to a technique of keeping a remaining charge of a storage battery in a predetermined range in a fuel-cells system having a stack of fuel cells and the storage battery as power sources.

2. Description of the Prior Art

Proposed fuel-cells systems have a stack of fuel cells and a storage battery as power sources that supply electric power to a loading (for example, JAPANESE PATENT LAYING-OPEN GAZETTE No. 47-32321). In such a fuel-cells system, a predetermined contact disposed in a circuit constituting the fuel-cells system opens and closes, in order to enable a stack of fuel cells alone to supply electric power to a relatively small loading and enable both the stack of fuel cells and a storage battery to be discharged and supply electric power to a greater loading. In case that the remaining charge of the storage battery is lowered, the connection of the circuit is switched to enable the fuel cells to charge the storage battery while supplying electric power to the loading. The fuel cells are characterized by a voltage decrease with an increase in output electric current. This proposed structure having both the fuel cells and the storage battery ensures a sufficient output even when the loading has large power consumption.

In the proposed fuel-cells system however, when the remaining charge of the storage battery is lowered, the predetermined contact disposed in the circuit constituting the fuel-cells system is switched to change the state of the storage battery from the discharging condition to the charging condition. Upon condition that a large amount of electric power is supplied to the loading, a decrease in remaining charge of the storage battery results in switching the contact. In case that the loading continuously requires large power consumption, no supply of electric power from the storage battery causes the fuel cells to be exposed to the excess loading. This significantly lowers the output voltage and thereby causes an insufficient output.

The above structure controls the charge-discharge state of the storage battery by opening and closing the predetermined contact according to the remaining charge of the storage battery. Another possible structure has the storage battery and the fuel cells arranged in parallel to each other and changes the output state of the storage battery between the charging state and the discharging state, based on the output voltage difference between the storage battery and the fuel cells that varies with a variation in amount of loading. In the latter structure, the remaining charge of the storage battery is continuously lowered under the condition of large loading, and the fuel cells are accordingly exposed to excess loading.

In these structures, in case that the lowered remaining charge of the storage battery results in an insufficient supply of electric power from the storage battery, an increase in loading applied to the fuel cells may lead to various problems. When an increase in loading to the fuel cells causes the output electric current from the fuel cells to exceed a predetermined level, increase in supplies of material gases fed to the fuel cells does not sufficiently increase the amount of power generation. This also makes the voltage unstable and may cause fan abrupt drop of the voltage.

When the output electric current from the fuel cells exceeds the predetermined level and the voltage is made unstable, a phenomenon that reverses the positive electrode and the negative electrode and is generally referred to as the change of poles may be observed in a unit cell included in the fuel cells. The change of poles makes the voltage unstable and causes the energy, which is expected to be converted to electrical energy through electrochemical reactions, to be released as thermal energy. The release of thermal energy causes partial excess heating in the fuel cells and thereby shortens the life of the fuel cells.

SUMMARY OF THE INVENTION

One object of the present invention is thus to prevent the remaining charge of a storage battery from decreasing to a critical level in a fuel-cells system, in order to ensure a sufficient supply of electric power from the storage battery and protect fuel cells from an excess loading, thereby preventing a variety of troubles that may occur in the fuel cells, such as a voltage drop and excess heating.

Another object of the present invention is to provide such a fuel-cells system and an electric vehicle with such a fuel-cells system mounted thereon.

At least part of the above and the other related objects are realized by a fuel-cells system having a stack of fuel cells and a storage battery connected parallel to each other and to a loading and giving a supply of electric power from said stack of fuel cells and said storage battery to said loading. The fuel-cells system of the present invention includes: remaining charge detection means for detecting a remaining charge of said storage battery; and output control means for, when the detected remaining charge of said storage battery is less than a predetermined level, restricting the supply of electric power to said loading.

The fuel-cells system of the present invention restricts the supply of electric power to the loading according to the remaining charge of the storage battery. This structure effectively prevents the remaining charge of the storage battery from decreasing to the critical level, and protects the stack of fuel cells from excess loading. This structure accordingly prevents various troubles, such as a voltage drop of the fuel cells and partial excess heating, that may occur due to excess electric current taken out of the fuel cells.

In accordance with another preferable application, the loading that receives the supply of electric power includes a plurality of loads, and the output control means cuts the supply of electric power to at least one load among said plurality of loads included in said loading, in order to restrict the supply of electric power to said loading.

In accordance with still another preferable application, the output control means limits the supply of electric power to said loading to a predetermined value, in order to enable said stack of fuel cells to charge said storage battery.

In the fuel-cells system of this preferable structure, when the remaining charge of the storage battery is lowered, the fuel cells charge the storage battery, so as to recover the remaining charge of the storage battery.

In accordance with one preferable structure, the remaining charge detection means includes: electric current measurement means for measuring at least two electric currents selected among a fuel-cells current output from said stack of fuel cells, a storage battery current output from said storage battery, and an overall electric current, which is a sum of said fuel-cells current and said storage battery current; and means for detecting the remaining charge of said storage battery based on said at least two electric currents measured by said electric current measurement means.

The fuel-cells system of this preferable application does not require a remaining charge monitor for detecting the remaining charge of the storage battery and thereby has simplified structure. This structure without a remaining charge monitor simply measures the electric currents and carries out predetermined arithmetic operations to determine the remaining charge of the storage battery.

In accordance with another preferable structure, the remaining charge detection means includes: current measurement means for measuring a storage battery current output from said storage battery; voltage measurement means for measuring a voltage in said fuel-cells system; and means for detecting the remaining charge of said storage battery based on said storage battery current measured by said current measurement means and said voltage measured by said voltage measurement means.

The fuel-cells system of this preferable application does not require a remaining charge monitor for detecting the remaining charge of the storage battery and thereby has simplified structure. This structure without a remaining charge monitor simply measures the electric current and the voltage and carries out predetermined arithmetic operations to determine the remaining charge of the storage battery.

The present invention is also directed to an electric vehicle having a motor rotated by electrical energy and means for transmitting a rotational force of the motor to an axle, thereby producing a driving force for the vehicle. The electric vehicle has the fuel-cells system of the present invention mounted thereon, and the motor is driven by a supply of electric power from the fuel-cells system.

In the electric vehicle of the present invention, it is preferable that the output control means controls operation of said motor, in order to restrict the supply of electric power to said motor.

This structure does not require any special circuit including a predetermined resistance, in order to limit the supply of electric power to the motor.

In a fuel-cells system comprising a stack of fuel cells and a storage battery connected parallel to each other and to a loading and giving a supply of electric power from said stack of fuel cells and said storage battery to said loading, the present invention is also directed to a method of controlling the supply of electric power to said loading. The method includes the steps of:

(a) detecting a remaining charge of said storage battery; and (b) when the remaining charge of said storage battery detected in said step (a) is not greater than a predetermined level, restricting the supply of electric power to said loading.

In the method of the present invention, the step (b) may include the step of: cutting the supply of electric power to at least one load among a plurality of loads included in said loading, and thereby restricting the supply of electric power to said loading.

In the method of the present invention, the step (b) may include the step of: limiting the supply of electric power to said loading to a predetermined value, in order to enable said stack of fuel cells to charge said storage battery.

In accordance with one preferable application of the method, the step (a) includes the steps of:

(a-1) measuring at least two electric currents selected among a fuel-cells current output from said stack of fuel cells, a storage battery current output from said storage battery, and an overall electric current, which is a sum of said fuel-cells current and said storage battery current; and (a-2) detecting the remaining charge of said storage battery based on said at least two electric currents measured in said step (a-1).

In accordance with another preferable application of the method, the step (a) includes the steps of:

(a-11) measuring a storage battery current output from said storage battery;

(a-12) measuring a voltage in said fuel-cells system; and (a-13) detecting the remaining charge of said storage battery based on said storage battery current measured in said step (a-11) and said voltage measured in said step (a-12).

The electric vehicle of the present invention may further include alarm means for, when the output control means restricts the supply of electric power to the motor, informing a driver of restriction of the supply of electric power. The alarm means may be a predetermined alarm lamp, a sound alarm informing the driver of the state under the output control, or a predetermined alarm beep.

In the actual electric vehicle, when the driver steps on an accelerator pedal under the condition of restricted supply of electric power to the motor, the vehicle speed may not be increased or may be even lowered There is also a possibility of stopping the vehicle. Even in such cases, the above structure effectively prevents the driver from mistakenly considering the state of output control as a malfunction of the vehicle. The restricted supply of electric power to the motor generally lowers the operatability of the vehicle. The structure of informing the driver of the restricted supply of electric power ensures the safety driving under the conditions of output control.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
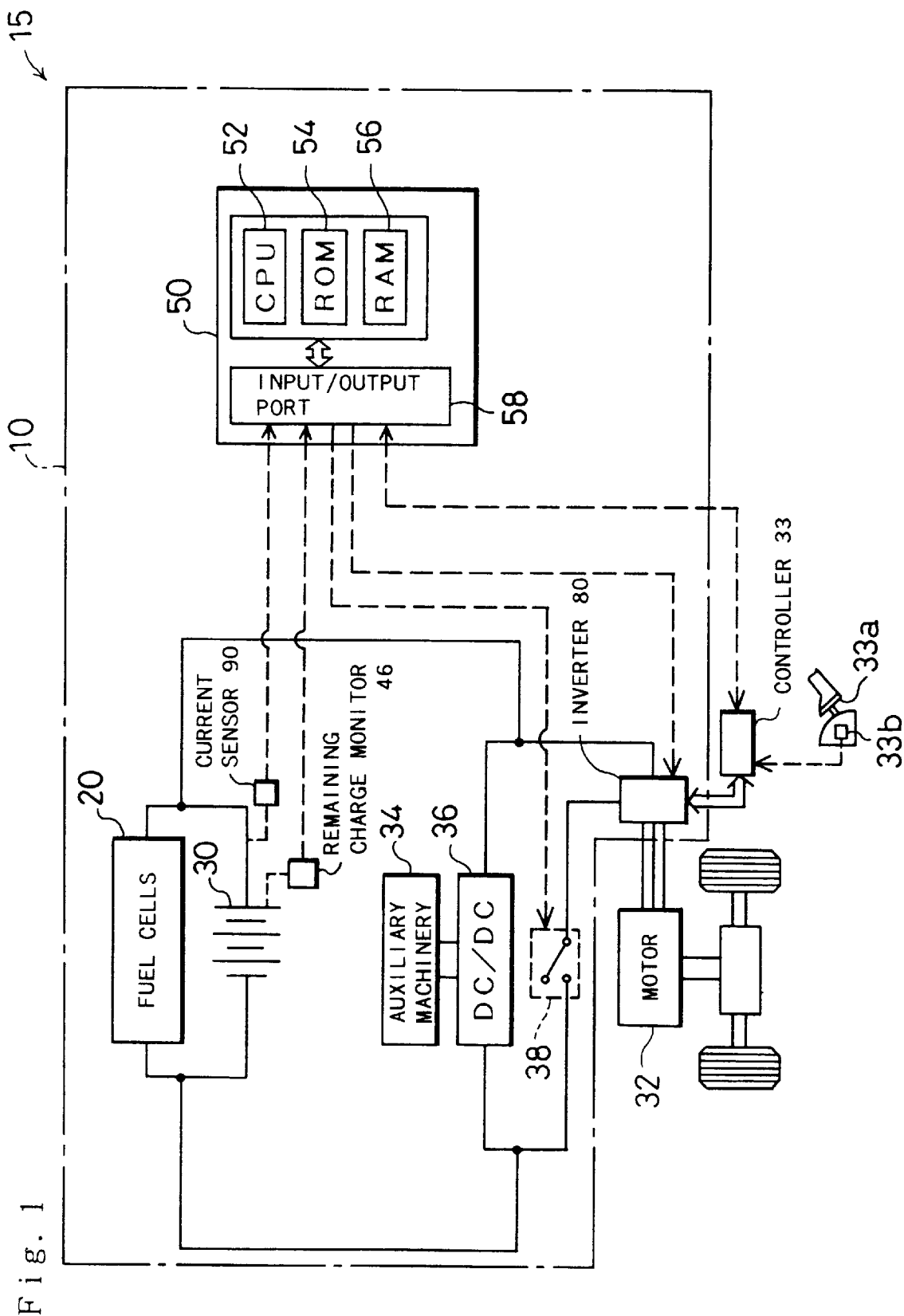
FIG. 1 is a block diagram illustrating structure of an electric vehicle 15 with a fuel-cells system 10 mounted thereon, as a first embodiment according to the present invention.

Some modes of carrying out the present invention are described as preferred embodiments, in order to further clarify the structures and functions of the present invention. FIG. 1 is a block diagram schematically illustrating structure of an electric vehicle 15 with a fuel-cells system 10 mounted thereon, as a first embodiment according to the present invention. The fuel-cells system 10 of the embodiment is mounted on the electric vehicle 15 and works as a power source for driving the vehicle 15. The fuel-cells system 10 primarily includes fuel cells 20, a storage battery 30, auxiliary machinery 34, a DC/DC converter 36, an on/off switch 38, a remaining charge monitor 46, a control unit 50, an inverter 80, and a current sensor 90 and supplies electric power to a motor 32 for driving the vehicle. The following describes the constituents related to the fuel-cells system 10 in the electric vehicle 15.

The fuel cells 20 are polymer electrolyte fuel cells, which are constructed as a stack of plural unit cells 28. The fuel cells 20 receive a supply of hydrogen-containing gaseous fuel on the side of cathodes and a supply of oxygen-containing oxidizing gas on the side of anodes and generate an electromotive force through the electrochemical reactions shown below:

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Figure 2:
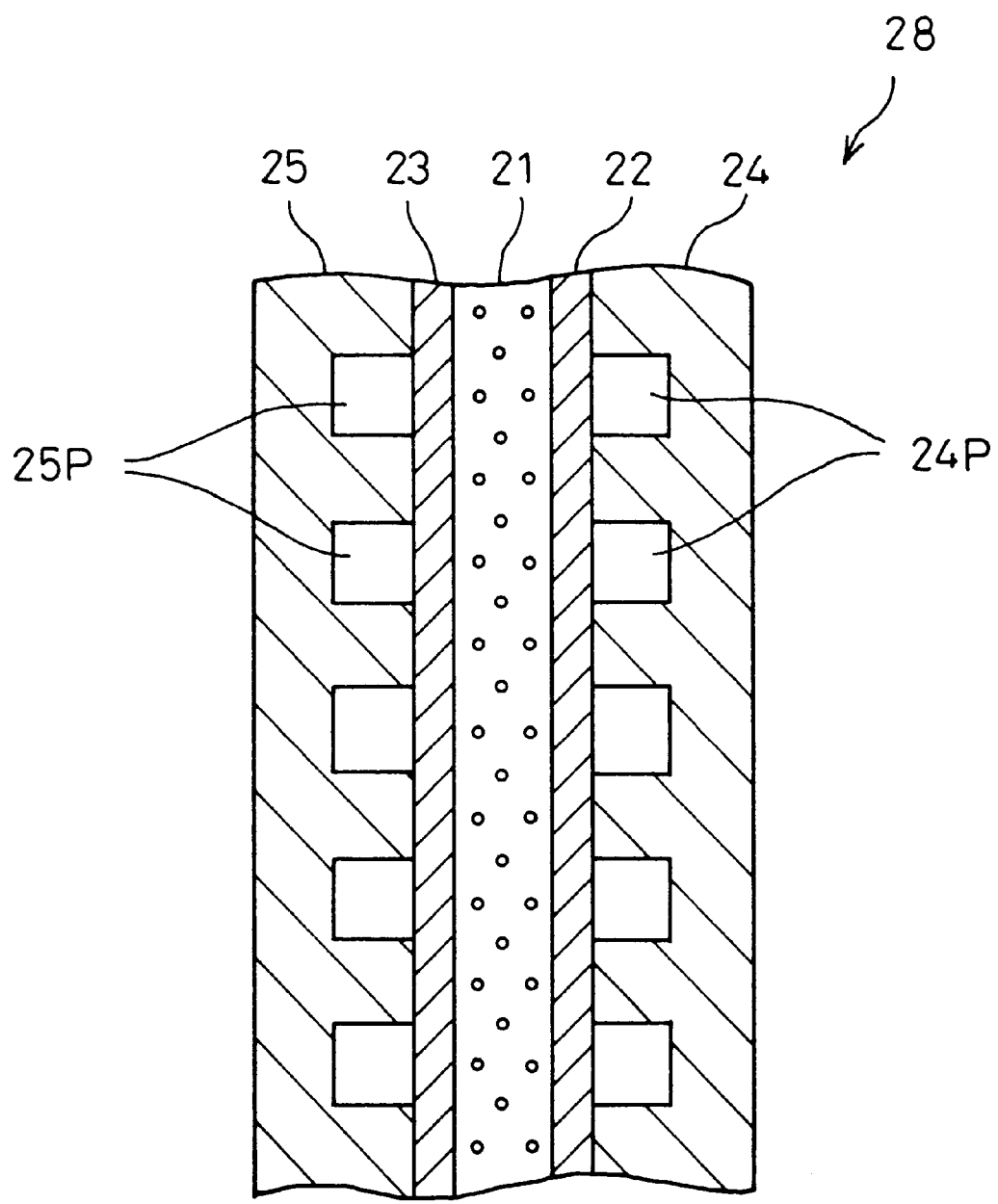
FIG. 2 is a cross sectional view schematically illustrating structure of a unit cell 28 in a stack of fuel cells 20.

Equations (1), (2), and (3) respectively denote a reaction occurring at the cathodes, a reaction occurring at the anodes, and a total reaction occurring in the whole fuel cells 20. FIG. 2 is a cross sectional view illustrating structure of each unit cell 28 in the stack of fuel cells 20. The unit cell 28 includes an electrolyte membrane 21, an anode 22, a cathode 23, and separators 24 and 25.

The anode 22 and the cathode 23 are gas diffusion electrodes arranged across the electrolyte membrane 21 to construct a sandwich-like structure. The separators 24 and 25 are disposed outside the sandwich-like structure and respectively connected to the anode 22 and the cathode 23 to form flow paths of gaseous fuel and oxidizing gas. Flow paths 24P of gaseous fuel are defined by the anode 22 and the separator 24, whereas flow paths 25P of oxidizing gas are defined by the cathode 23 and the separator 25. Although the separators 24 and 25 respectively form the flow paths on their single side faces in the drawing of FIG. 2, ribs are formed on either side faces of each separator in the actual state. Namely one side face of each separator combined with the anode 22 forms the flow paths 24P of gaseous fuel, while the other side face combined with the cathode 23 of an adjoining unit cell forms the flow paths 25P of oxidizing gas. In this manner, the separators 24 and 25 are joined with the gas diffusion electrodes to define gas flow paths and separate the flow of gaseous fuel from the flow of oxidizing gas between the adjoining unit cells. In the process of laying a number of unit cells 28 one upon another to form a stack structure, the two separators located on both ends of the stack structure may have ribs only on their single side faces coming into contact with the gas diffusion electrodes.

The electrolyte membrane 21 is a proton-conductive ion-exchange membrane composed of a polymer material, such as fluororesin, and shows favorable electrical conductivity in the wet state. In this embodiment, a Nafion membrane (manufactured by du Pont) is applied for the electrolyte membrane 21. The surface of the electrolyte membrane 21 is coated with platinum or a platinum-containing alloy functioning as a catalyst. The technique adopted in this embodiment to apply the catalyst prepares carbon powder with platinum or a platinum-containing alloy carried thereon, disperses the catalyst-carried carbon powder into an appropriate organic solvent, adds a specific amount of an electrolyte solution (for example, Nafion solution manufactured by Aldrich Chemical Corp.) to the dispersion to form a paste, and screen-prints the paste on the electrolyte membrane 21. Another available technique forms the paste containing the catalyst-carried carbon powder to a sheet and presses the sheet onto the electrolyte membrane 21. Although the platinum-containing catalyst is applied on the electrolyte membrane 21 in this embodiment, the catalyst may be applied on the anode 22 and the cathode 23, which are in contact with the electrolyte membrane 21.

The anode 22 and the cathode 23 are made of carbon cloth, which is woven of yarns consisting of carbon fibers. Although the anode 22 and the cathode 23 are composed of carbon cloth in this embodiment, carbon paper or carbon felt consisting of carbon fibers are also favorably applicable for the material of the anode 22 and the cathode 23.

The separators 24 and 25 are made of a gas-impermeable conductive material, for example, gas-impermeable, dense carbon obtained by compressing carbon. Each of the separators 24 and 25 has a plurality of ribs arranged in parallel and formed on both side faces thereof. As discussed previously, each separator is combined with the surface of the anode 22 to define the flow paths 24P of gaseous fuel and with the surface of the cathode 23 of the adjoining unit cell to define the flow paths 25P of oxidizing gas. In accordance with another possible structure, the ribs formed on one side face of each separator may be arranged perpendicular to or at a certain angle with those formed on the other side face of the separator. As long as the gaseous fuel and the oxidizing gas can be supplied to the gas diffusion electrodes, the ribs may not be formed as parallel grooves.

As discussed above, each unit cell 28, which is the fundamental structure of the fuel cells 20, has the separator 24, the anode 22, the electrolyte membrane 21, the cathode 23, and the separator 25, which are arranged in this sequence. The stack of fuel cells 20 is obtained by stacking plural sets of such unit cells 28 (100 sets in this embodiment) and setting current collector plates (not shown), which are made of dense carbon or copper plates, on both ends of the stack structure.

Figure 3:
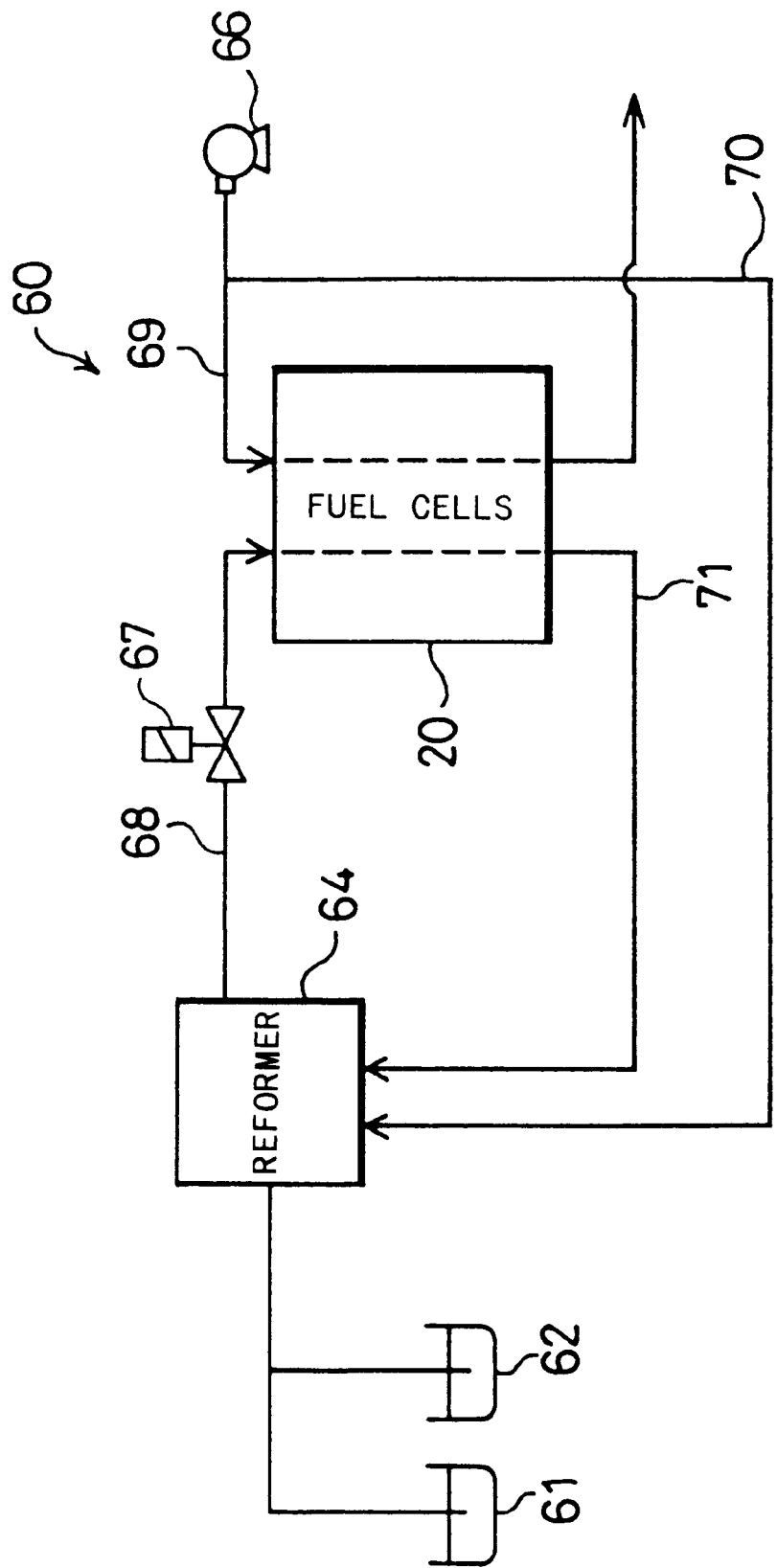
FIG. 3 is a block diagram illustrating structure of a fuel-cells unit 60.

Although being omitted from the illustration in the block diagram of FIG. 1, predetermined peripheral devices other than the fuel cells of the stack structure are required to generate electricity by means of the fuel cells. FIG. 3 is a block diagram illustrating structure of a fuel-cells unit 60 including the stack of fuel cells 20 and peripheral devices. The fuel-cells unit 60 primarily includes the stack of fuel cells 20, a methanol tank 61, a water tank 62, a reformer 64, and an air compressor 66.

The reformer 64 receives supplies of methanol and water from the methanol tank 61 and the water tank 62, respectively. The reformer 64 reforms the supply of methanol, which has been fed as a crude fuel, by steam reforming to produce a hydrogen-rich gaseous fuel. A reforming reaction expressed by the following equations occurs in the reformer 64:

$$CH_3OH \rightarrow CO + 2H_2 \qquad (4)$$

$$CO + H_2O \rightarrow CO_2 + H_2 \qquad (5)$$

$$CH_3OH + H_2O \rightarrow CO_2 + 3H_2 \qquad (6)$$

The decomposing reaction of methanol expressed by Equation (4) proceeds simultaneously with the reforming reaction of carbon monoxide expressed by Equation (5), so that the reaction of Equation (6) occurs as the overall reforming reaction of methanol in the reformer 64. This reforming reaction is endothermic as a whole. A hydrogen-rich gaseous fuel produced by the reformer 64 is fed to the stack of fuel cells 20 via a fuel supply conduit 68, led into the flow paths 24P of gaseous fuel in the respective unit cells 28 included in the stack of fuel cells 20, and subjected to the cell reaction at the anodes 22. The reaction occurring at the anodes 22 is expressed by Equation (1) given above. With a view to supplying a required amount of water and preventing the electrolyte membrane 21 from being dried, a humidifier may be disposed in the fuel supply conduit 68. In this structure, the humidified gaseous fuel is supplied to the fuel cells 20.

The air compressor 66 takes in and pressurizes the air and feeds a supply of the pressurized air to the fuel cells 20. The air taken in and pressurized by the air compressor 66 is fed to the fuel cells 20 via an air supply conduit 69, led into the flow paths 25P of oxidizing gas in the respective unit cells 28 included in the stack of fuel cells 20, and subjected to the cell reaction at the cathodes 23. In the fuel cells, the velocity of reaction increases generally with an increase in pressure of the gases supplied to both the anodes and the cathodes. This improves the performance of the fuel cells. This is why the air fed to the cathodes 23 is pressurized by the air compressor 66. The pressure of the gaseous fuel fed to the anodes 22 can be regulated readily by controlling the on-off state of a solenoid-operated valve 67, which works as a mass flow controller and is disposed in the fuel supply conduit 68.

The exhaust of gaseous fuel after the cell reaction at the anodes 22 in the fuel cells 20 and part of the air compressed by the air compressor 66 are fed to the reformer 64. As mentioned previously, the overall reforming reaction occurring in the reformer 64 is endothermic and requires an external supply of heat. A burner (not shown) for heating is thus disposed in the reformer 64. The exhaust of gaseous fuel and the compressed air are used for combustion of the burner. The exhaust of gaseous fuel discharged from the cathodes 23 of the fuel cells 20 are led into the reformer 64 via a fuel exhaust conduit 71, whereas the compressed air is led to the reformer 64 via an air path branch 70 branching off from the air supply conduit 69. Hydrogen remaining in the exhaust of gaseous fuel and oxygen in the compressed air are used for combustion of the burner, in order to supply a required amount of heat for the reforming reaction.

The outputs of the fuel cells 20 are controlled by regulating the flows of gaseous fuel andoxidizing gas according to the amount of a connected loading. The control of the outputs is carried out by the control unit 50. The control unit 50 outputs driving signals to the air compressor 66 and the solenoid-operated valve 67 disposed in the fuel supply conduit 68 to adjust the driving amount and the on/off state thereof. Such adjustment regulates the flows of gas supplies and thereby controls the outputs of the fuel cells 20.

The fuel cells 20 discussed above are connected to the storage battery 30, the motor 32, and the auxiliary machinery 34. The fuel cells 20 supply electric power to the motor 32 and the auxiliary machinery 34 and charge the storage battery 30 according to the state of the loading. The control procedure relating to the charge and discharge state of the storage battery 30 will be described in detail later.

The storage battery 30 works together with the fuel cells 20 as a power source to supply the motor 32 and the auxiliary machinery 34 with electric power. The storage battery 30 is a lead-acid accumulator in this embodiment, although other secondary batteries, such as a nickel-cadmium accumulator, a nickel-hydrogen accumulator, and a lithium secondary battery, are also applicable. The capacity of the storage battery 30 is determined according to the size and the expected driving conditions of the electric vehicle 15 with the fuel-cells system 10 mounted thereon as well as according to the required performances (for example, the maximum speed and the running distance) for the electric vehicle 15.

The motor 32 is a three-phase synchronous motor. As discussed later, the inverter 80 converts the direct current output from the fuel cells 20 and the storage battery 30 to three-phase alternating current and supplies the three-phase alternating current to the motor 32. The motor 32 receives a supply of the alternating current and produces a rotating driving force. The rotating driving force is transmitted to front wheels and/or rear wheels via an axle of the vehicle with the fuel-cells system 10 mounted thereon and functions as a power to drive the vehicle. The motor 32 is controlled by a controller 33. The controller 33 is also connected to an accelerator pedal position sensor 33b for detecting a step-on amount of an accelerator pedal 33a. The controller 33 is further connected to the control unit 50 and transmits various pieces of information, for example, regarding the operation of the motor 32, to and from the control unit 50.

The auxiliary machinery 34 is a loading that consumes electric power in a predetermined range during the operation of the fuel-cells system 10. The auxiliary machinery 34 includes, for example, the air compressor 66, the mass flow controller, and a water pump. The air compressor 66 regulates the pressure of oxidizing gas fed to the fuel cells 20 as mentioned above. The water pump circulates the cooling water under pressure through the fuel cells 20. Circulation of the cooling water leads to heat exchange in the fuel cells 20, thereby keeping the internal temperature of the fuel cells 20 at a predetermined or lower level. The mass flow controller regulates the pressure and the flow of the gaseous fuel fed to the fuel cells 20 as mentioned above. Although the fuel cells 20 and the auxiliary machinery 34 are illustrated independently in the block diagram of FIG. 1, the elements relating to the control of the driving state of the fuel cells 20 can be regarded as peripheral devices of the fuel cells 20. The power consumption of such auxiliary machinery 34 is 5 kw at the maximum, which is significantly smaller than the power consumption of the motor 32 and has little variation.

The DC/DC converter 36 converts the voltage of electrical energy output from the fuel cells 20 and the storage battery 30 and applies the converted voltage to the auxiliary machinery 34. The voltage required for driving the motor 32 is generally 200 V to 300 V, and the corresponding voltage is output from the fuel cells 20 and the storage battery 30. On the other hand, the voltage required for driving the auxiliary machinery 34, such as the water pump, is only about 12 V. It is accordingly impossible to directly apply the voltage output from the fuel cells 20 and the storage battery 30 to the auxiliary machinery 34. The DC/DC converter 36 thus lowers the voltage output from the fuel cells 20 and the storage battery 30 and applied to the auxiliary machinery 34.

The on/off switch 38 is arranged in the circuit, which connects the motor 32 and the auxiliary machinery 34 to the fuel cells 20 and the storage battery 30 in parallel. The on/off switch 38 is switched between the on position, at which the fuel cells 20 and the storage battery 30 are connected to the motor 32, and the off position, at which the fuel cells 20 and the storage battery 30 are disconnected from the motor 32. The switching condition of the on/off switch 38 is controlled by the control unit 50.

The remaining charge monitor 46 measures the remaining charge of the storage battery 30 and is realized by an SOC meter in this embodiment. The SOC meter accumulates the values of electric current and time of charge and discharge in the storage battery 30, and the control unit 50 calculates the remaining charge of the storage battery 30 based on the accumulated values. The remaining charge monitor 46 may be realized by a voltage sensor, instead of the SOC meter. The storage battery 30 lowers the voltage with a decrease in remaining charge. The voltage sensor takes advantage of this characteristic and measures the voltage, in order to detect the remaining charge of the storage battery 30. The voltage sensor is connected to the control unit 50. The relationship between the voltage measured by the voltage sensor and the remaining charge is stored in advance in the control unit 50. The control unit 50 thus determines the remaining charge of the storage battery 30 based on the measurements input from the voltage sensor. As another example, the remaining charge monitor 46 may be a device for measuring the specific gravity of an electrolytic solution in the storage battery 30 to detect the remaining charge.

The control unit 50 is constructed as an arithmetic and logic circuit including a microcomputer, and has a CPU 52, a ROM 54, a RAM 56, and an input/output port 58. The CPU 52 carries out a variety of arithmetic operations according to preset control programs. Control programs and control data required for the variety of arithmetic operations executed by the CPU 52 are stored in advance in the ROM 54. Various data required for the arithmetic operations executed by the CPU 52 are temporarily written in and read from the RAM 56. The input/output port 58 receives detection signals from a variety of sensors, such as the remaining charge monitor 46, and outputs driving signals to the on/off switch 38 and the inverter 80 according to the results of arithmetic operations by the CPU 52, thereby controlling the driving state of the respective elements of the fuel-cells system 10.

With respect to the control unit 50, the block diagram of FIG. 1 only shows input of detection signals from the remaining charge monitor 46 and signals from the current sensor 90, output of driving signals to the inverter 80 and the on/off switch 38, and transmission of signals to and from the controller 33. The control unit 50, however, also carries out other control operations (not shown) in the fuel-cells system 10. By way of example, the control unit 50 carries out control of the operating state of the fuel cells 20. As mentioned previously, the other control operations executed by the control unit 50 include output of driving signals to the air compressor 66 and the mass flow controller to regulate the flows of oxidizing gas and gaseous fuel, regulation of the amounts of methanol and water supplied to the reformer 64, and temperature control of the fuel cells 20 and the reformer 64.

The inverter 80 converts the direct current output from the fuel cells 20 and the storage battery 30 to three-phase alternating current and supplies the three-phase alternating current to the motor 32. The driving force generated by the motor 32 can be controlled by regulating the amplitude (actually the pulse width) and the frequency of the three-phase alternating current supplied to the motor 32, based on instructions given by the control unit 50. The inverter 80 includes six switching elements (for example, bipolar MOS-FET (IGBT)) as primary circuit elements. The switching operation of these switching elements converts the direct current supplied from the fuel cells 20 and the storage battery 30 to the three-phase alternating current of arbitrary amplitude and frequency. Each switching element included in the inverter 80 is connected to the control unit 50 via a conductive line and has a switching timing controlled by a driving signal output from the control unit 50.

The current sensor 90 measures the output electric current from the storage battery 30. The output state of the storage battery 30 is either in the discharging state or in the charging state, and the output electric current implies those flowing both in the discharging state and in the charging state. The current sensor 90 is connected to the control unit 50, and the value of electric current measured by the current sensor 90 is input into the control unit 50. The input data of electric current is used to determine the charge and discharge state of the storage battery 30.

The fuel-cells system 10 thus constructed works in the manner discussed below. The following describes outputs from the fuel cells 20 and the storage battery 30 in the fuel-cells system 10. Since the fuel cells 20 and the storage battery 30 are connected parallel to each other, the amount of loading and the charging state of the storage battery 30 determine whether both the fuel cells 20 and the storage battery 30 supply electric power or the storage battery 30 is charged by the fuel cells 20.

Figure 4:
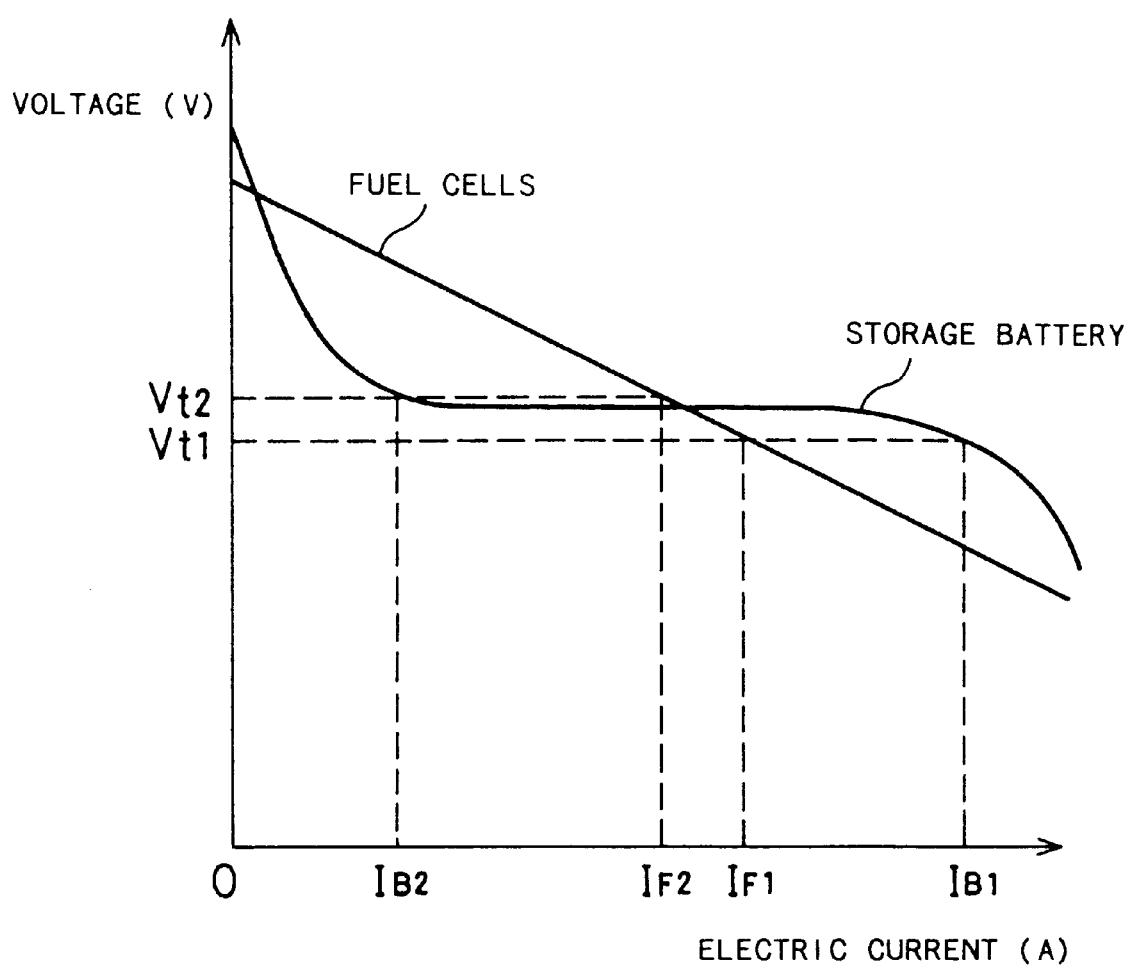
FIG. 4 is a graph showing output characteristics of the fuel cells 20 and a storage battery 30 in the sufficient charge state.

FIG. 4 is a graph showing output characteristics of the fuel cells 20 and the storage battery 30. The fuel cells 20 give large voltages under the condition of small loading, that is, under the condition of little output current, and decrease the voltage with an increase in electric current. The storage battery 30 can keep the voltage within a predetermined narrow range over a wide range of electric current, but varies the voltage according to the charging state thereof. The output characteristics of the storage battery 30 shown in FIG. 4 are in the sufficient charge state of the storage battery 30.

For example, It1 represents the overall electric current required for driving the motor 32 and the auxiliary machinery 34 in case that the vehicle with the fuel-cells system 10 mounted thereon is being accelerated and the motor 32 requires a large amount of electric power. At this moment, the voltage between output terminals of the fuel cells 20 and the storage battery 30 decreases with an increase in electric currents taken out of the fuel cells 20 and the storage battery 30. Since the fuel cells 20, the storage battery 30, and the motor 32 are connected parallel to one another, they have an identical end-to-end voltage, which is expressed as Vt1. Based on the graph of FIG. 4, output electric current IF1 of the fuel cells 20 and output electric current IB1 of the storage battery 30 satisfy the equation of It1=IF1+IB1, where IF1<IB1.

When the overall electric current required for driving the above loading is lowered to It2, the voltage between output terminals of the fuel cells 20 and the storage battery 30 increases corresponding to the decrease in overall electric current. In this state, the fuel cells 20, the storage battery 30, and the motor 32 also have an identical end-to-end voltage, which is expressed as Vt2. Based on the graph of FIG. 4, output electric current IF2 of the fuel cells 20 and output electric current IB2 of the storage battery 30 satisfy the equation of It2=IF2+IB2, where IF2>IB2. In this manner, the ratio of the output of the fuel cells 20 to the output of the storage battery 30 varies according to the amount of the loading.

Figure 5:
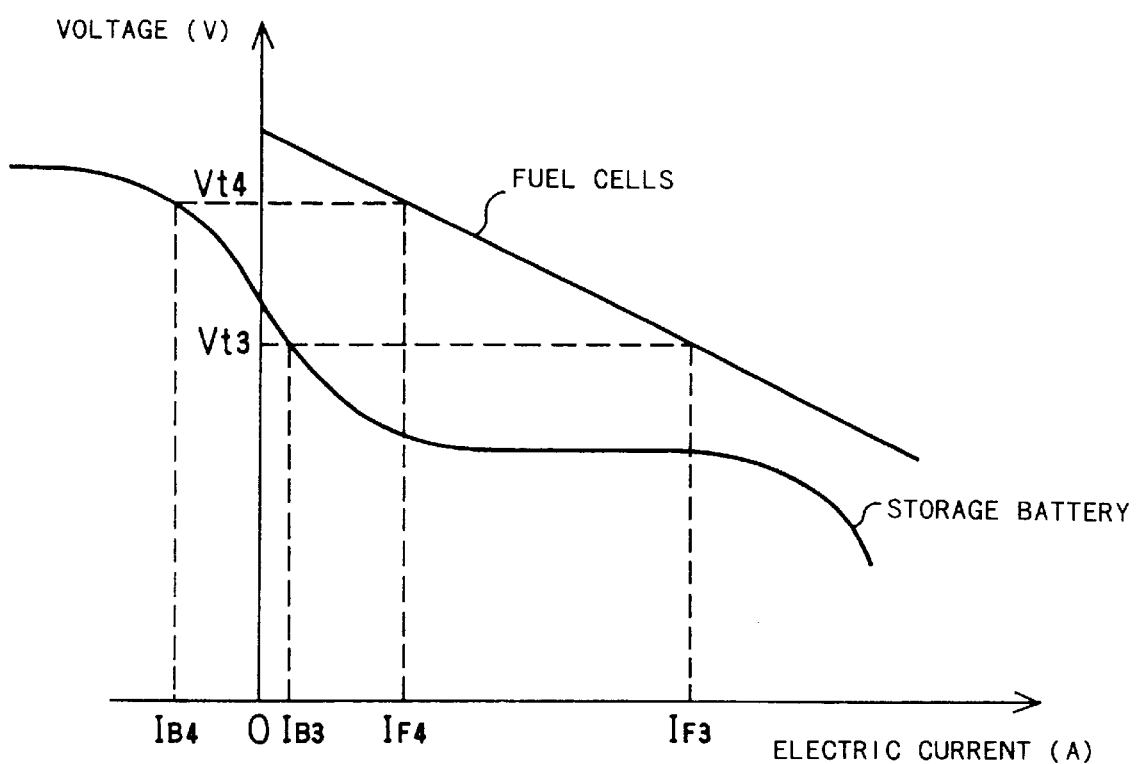
FIG. 5 is a graph showing output characteristics of the fuel cells 20 and the storage battery 30 in the insufficient charge state.

FIG. 5 is a graph showing the output characteristics of the fuel cells 20 and the storage battery 30 in the lowered charge state. It3 represents the overall electric current for driving the above loading when the motor 32 requires a predetermined amount of electric power. At this moment, the voltage between output terminals of the fuel cells 20 and the storage battery 30 decreases with an increase in electric currents taken out of the fuel cells 20 and the storage battery 30. As mentioned above, the fuel cells 20, the storage battery 30, and the motor 32 have an identical end-to-end voltage, which is expressed as Vt3. Based on the graph of FIG. 5, output electric current IF3 of the fuel cells 20 and output electric current IB3 of the storage battery 30 satisfy the equation of It3=IF3+IB3, where IF3>IB3. In case that the storage battery 30 is in the lowered charge state, a large portion of the output against the loading depends upon the fuel cells 20.

When the amount of electric power required by the motor 32 becomes smaller than a predetermined level and the overall electric current required for driving the above loading is lowered to It4, the voltage between output terminals of the fuel cells 20 and the storage battery 30 increases corresponding to the decrease in overall electric current. In this state, the fuel cells 20, the storage battery 30, and the motor 32 also have an identical end-to-end voltage, which is expressed as Vt4. Based on the graph of FIG. 5, output electric current IF4 of the fuel cells 20 and output electric current IB4 of the storage battery 30 satisfy the equation of It4=IF4+IB4, where IB4<0. This means that the storage battery 30 is charged by the fuel cells 20. In case that the storage battery 30 is in the insufficient charge state, a decrease in amount of loading to or below a predetermined level causes the fuel cells 20 to charge the storage battery 30 simultaneously with driving the loading.

The fuel-cells system 10 of the embodiment carries out control according to the remaining charge of the storage battery 30. In this embodiment, when the remaining charge of the storage battery 30 is not greater than a predetermined level, the control procedure restricts the output from the fuel-cells system 10, that is, the amount of electric power consumed by the electric vehicle 15 with the fuel-cells system 10 mounted thereon, and limits the output to a predetermined amount until the remaining charge is recovered to or above the predetermined level. The electric power consumed by the electric vehicle 15 with the fuel-cells system 10 mounted thereon includes the electric power consumed by the motor 32 as well as the electric power consumed by the auxiliary machinery 34. As discussed above, however, most of the electric power consumed by the auxiliary machinery 34 is used to maintain the fuel-cells system 10 in an operating state, so that the target electric power to be restricted is the electric power consumed by the motor 32.

Figure 6:
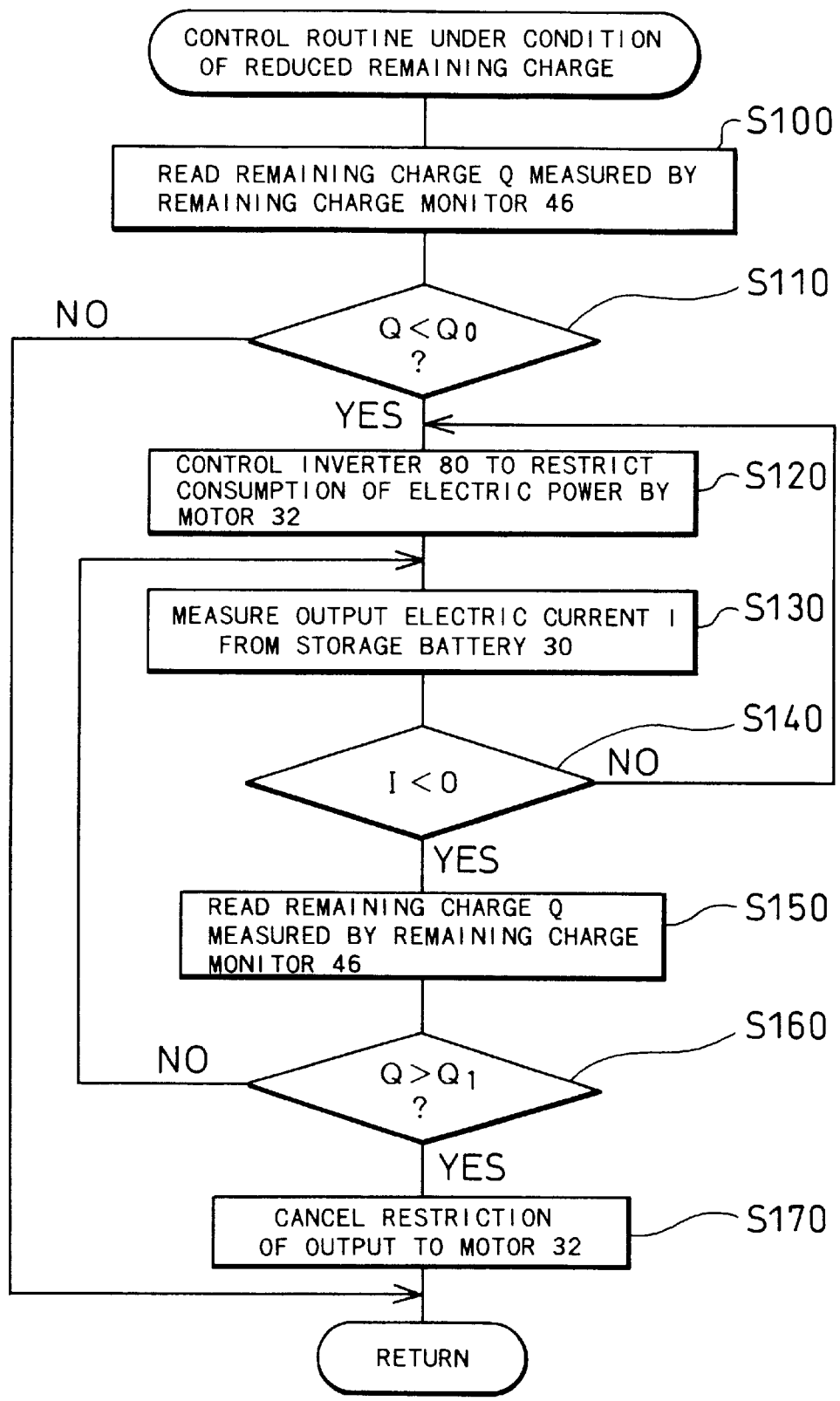
FIG. 6 is a flowchart showing a control routine under the condition of reduced remaining charge of the storage battery 30, which is executed during operation of the fuel-cells system 10 of the first embodiment.

The fuel-cells system 10 of the embodiment carries out the above control procedure based on a control routine under the condition of reduced remaining charge shown in the flowchart of FIG. 6. The routine of FIG. 6 is carried out by the CPU 52 at predetermined time intervals, for example, at every 10 sec, after a predetermined start switch is turned on to start the fuel-cells system 10 mounted on the vehicle.

When the program enters the routine of FIG. 6, the CPU 52 first reads a remaining charge Q of the storage battery 30 measured by the remaining charge monitor 46 at step S100, and compares the observed remaining charge Q with a preset reference value Q0 at step S110. In case that the observed value Q is not smaller than the reference value Q0, the program determines that the storage battery 30 has a sufficient remaining charge and exits from this routine.

In case that the observed remaining charge Q is smaller than the reference value Q0 at step S110, on the contrary, the program determines that the storage battery 30 has an insufficient remaining charge and controls the inverter 80 to limit the electric power consumed by the motor 32 to a predetermined limit value at step S120. In accordance with a concrete procedure, the CPU 52 controls the switching timing of the switching elements included in the inverter 80 and restricts the amplitude or the frequency of the three-phase alternating current converted from the direct current and supplied to the motor 32 to a predetermined value, thereby limiting the electric power consumed by the motor 32 to the predetermined limit value. In case that the current electric power consumed by the motor 32 is greater than this limit value, restriction of the electric power consumed by the motor 32 to the predetermined limit value decreases the total amount of electric power consumed by the whole electric vehicle 15. This results in an increase in output voltages of the fuel cells 20 and the storage battery 30 and thereby varies the output state of the storage battery 30. The CPU 52 then reads output electric current I of the storage battery 30 measured by the current sensor 90 at step S130, and determines whether the output electric current I is positive or negative at step S140.

When it is determined at step S140 that the output electric current I of the storage battery 30 is positive, this means that the output of electric power from the storage battery 30 still continues. The program accordingly returns to step S120 to reset the limit value of the electric power consumed by the motor 32 and further decrease the consumption of electric power. The program then reads the observed output electric current I of the storage battery 30 at step S130 and checks the sign of the output electric current I at step S140. When it is determined at step S140 that the output electric current I of the storage battery 30 is negative, on the other hand, the program determines that a decrease in electric power consumed by the motor 32 changes the output state of the storage battery 30 from the discharging state to the charging state. The output state of the storage battery 30 is changed to the charging state by repeating the check of the sign of the output electric current I from the storage battery 30 and the restriction of the electric power consumed by the motor 32 to the reset limit value according to the requirements.

In case that the output electric current I of the storage battery 30 is determined to be negative at step S140, the CPU 52 again reads the remaining charge Q of the storage battery 30 measured by the remaining charge monitor 46 at step S150. The program then compares the observed remaining charge Q with a preset reference value Q1 at step S160, in order to determine whether or not the remaining charge of the storage battery 30 has been recovered to a sufficient level. When the observed remaining charge Q of the storage battery 30 exceeds the reference value Q1 at step S160, the program determines that the remaining charge of the storage battery 30 has been recovered to the sufficient level. In this case, the program proceeds to step S170 to cancel the limit of the output to the motor 32, which has been set at step S120, and exits from this routine. The reference value Q1 may be identical with the reference value Q0 used at step S110, but is preferably greater than the reference value Q0 in order to ensure the stability of control.

When the observed remaining charge Q of the storage battery 30 does not reach the reference value Q1 at step S160, on the other hand, the program determines that the remaining charge of the storage battery 30 has not yet been recovered to the sufficient level. In this case, the program returns to step S130 to measure the output electric current I from the storage battery 30, and then goes to step S140 to confirm that the output state of the storage battery 30 is in the charging state. After confirming that the output state of the storage battery 30 is in the charging state, the program again reads the remaining charge Q of the storage battery 30 measured by the remaining charge monitor 46 at step S150 and compares the observed remaining charge Q with the reference value Q1 at step S160. These steps are repeated according to the requirements. In case that the observed remaining charge Q of the storage battery 30 exceeds the reference value Q1 at step S160, the program proceeds to step S170 to cancel the limit of the output to the motor 32 and exits from this routine.

As discussed later, in some cases, the output state of the storage battery 30 has been changed to the discharging state, when the program returns from step S160 to step S130 to measure the output electric current I from the storage battery 30 and checks the sign of the output electric current I at step S140. In such a case, the program further returns from step S140 to step S120, at which the CPU 52 resets the limit value of electric power consumption, in order to reduce the electric power consumed by the motor 32 and change the output state of the storage battery 30 to the charging state. After the output state of the storage battery 30 is changed to the charging state, the observed remaining charge Q of the storage battery 30 will exceed the reference value Q1 in due course at step S160. When the observed remaining charge Q of the storage battery 30 becomes greater than the reference value Q1, the program cancels the limit of the output to the motor 32 at step S170 and exits from this routine.

Further explanation is given for the electric power consumed by the motor 32 and the restriction thereof. The driving state of the motor 32 is controlled by the driving signal output from the control unit 50 to the inverter 80, based on, for example, the signal output from the accelerator pedal position sensor 33b. When the driver steps on the accelerator pedal 33a to instruct an increase in vehicle speed, the inverter 80 enhances the amplitude and the frequency of the three-phase alternating current converted from the direct current. Such control increases the torque and the revolving speed of the motor 32, thereby raising the speed of the vehicle and increasing the amount of electric power consumed by the motor 32. The restriction of the electric power consumed by the motor 32 is implemented by limiting the amplitude and the frequency of the three-phase alternating current supplied from the inverter 80 to the motor 32. The restriction of the amplitude and the frequency of the three-phase alternating current prevents the motor 32 from producing the torque greater than the level corresponding to the restricted amplitude or rotating at the revolving speed greater than the level corresponding to the restricted frequency, even when the driver steps on the accelerator pedal 33a. This results in restriction of the electric power consumed by the motor 32.

In some driving state of the motor 32, the electric power actually consumed by the motor 32 is not greater than the predetermined limit value, to which the electric power consumed by the motor 32 is limited at step S120. Even when the electric power actually consumed by the motor 32 is not greater than the predetermined limit value, in case that the output state of the storage battery 30 is in the discharging state, the program returns from step S140 to step S120 to reset the limit value of the electric power consumption by the motor 32. This eventually changes the output state of the storage battery to the charging state.

When the electric power actually consumed by the motor 32 is not greater than the predetermined limit value and the output state of the storage battery 30 is in the charging state, the program proceeds to steps S150 and S160 to monitor the remaining charge Q of the storage battery 30 until it becomes greater than the predetermined reference value Q1 as discussed previously. By way of example, it is here assumed that the electric power consumed by the motor 32 is increased to or above the limit value set at step S120 before the remaining charge Q of the storage battery 30 reaches the reference value Q1. Under such conditions, in case that the output state of the storage battery 30 is changed to the discharging state, the program returns from step S160 to step S130 since the remaining charge Q of the storage battery 30 does not reach the reference value Q1. The program then determines that the output state of the storage battery 30 is in the discharging state at step S140, and returns to step S120 to reset the limit value and further reduce the consumption of electric power. In this case, the control procedure repeatedly resets the limit value of the electric power consumed by the motor 32 in order to recover the remaining charge of the storage battery 30, until the output state of the storage battery 30 is eventually changed to the charging state. In case that the output state of the storage battery 30 is kept in the charging state when the electric power consumed by the motor 32 is increased to or above the limit value, the remaining charge Q of the storage battery 30 continues recovering and eventually reaches the predetermined reference value Q1.

In the fuel-cells system 10 discussed above, the consumption of electric power by the motor 32 is restricted in response to the decreased remaining charge of the storage battery 30. This effectively prevents the remaining charge of the storage battery 30 from decreasing to the critical level and protects the fuel cells 20 from excess loading. The control procedure repeatedly resets the limit value of the electric power consumed by the motor 32 until the output state of the storage battery 30 is changed to the charging state. This structure enables the decreased remaining charge of the storage battery 30 to be recovered to the sufficient level without delay, and thus protects the fuel cells 20 from various troubles that may occur due to an increased loading while the storage battery 30 has the lowered remaining charge. The possible troubles include a drop of output voltage of the fuel cells 20 due to an excess output from the fuel cells 20 and partial overheat and damage of the fuel cells 20.

Figure 7:
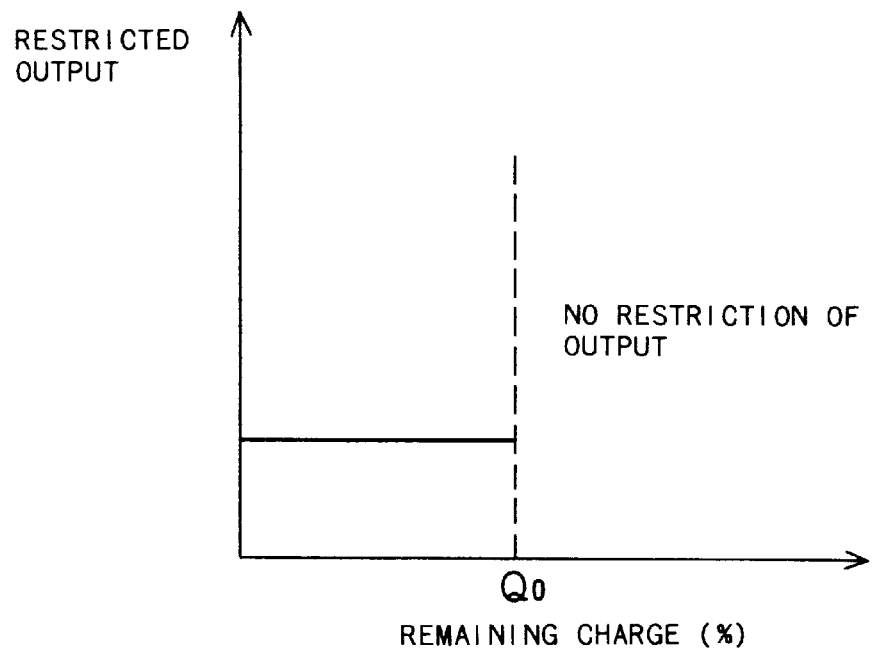
FIG. 7 shows a process of restricting the output under the condition of reduced remaining charge of the storage battery 30.

In the first embodiment, when the storage battery 30 is determined to have the insufficient remaining charge, the control procedure restricts the consumption of electric power by the motor 32 until the output state of the storage battery 30 is changed to the charging state. In accordance with another application, the control procedure only limits the electric power consumed by the storage battery 30 to a predetermined limit value. This also prevents the remaining charge of the storage battery 30 from decreasing to the critical level and protects the fuel cells 20 from excess loading. The limit value set to the output of the motor 32 upon condition that the storage battery 30 has the insufficient remaining charge may be a constant irrespective of the remaining charge of the storage battery 30 or a variable that decreases with a decrease in remaining charge of the storage battery 30. The graph of FIG. 7 shows the case, in which a constant is set to the limit value. In this case, while the remaining charge Q of the storage battery 30 is less than the predetermined reference value Q0, the output from the storage battery 30 is limited to the predetermined limit value. The actual control procedure restricts the amplitude and the frequency of the three-phase alternating current supplied from the inverter 80 to the motor 32, in order to limit the torque and the revolving speed of the motor 32 to the respective levels corresponding to the limit value. When the remaining charge Q of the storage battery 30 becomes equal to or greater than the reference value Q0, the restriction is cancelled to enable the revolving speed of the motor 32 to be arbitrarily regulated through an operation of the accelerator pedal 33a.

This structure restricts the consumption of electric power by the motor 32 in case that the remaining charge Q of the storage battery 30 is below the reference value Q0. The restriction protects the fuel cells 20 from excess loading due to the decreased remaining charge of the storage battery 30. The limit value of the electric power consumed by the motor 32 may be a value that changes the output state of the storage battery 30 to the charging state when the remaining charge Q of the storage battery 30 becomes equal to the reference value Q0. Under such conditions, the restriction of the consumption of electric power by the motor 32 enables the storage battery 30 to start charging and thus recover its remaining charge. By way of another example, the limit value may be a value that keeps the output state of the storage battery 30 in the discharging state even when the electric power consumed by the motor 32 is restricted to the limit value. In this case, the output state of the storage battery 30 is changed to the charging state when the remaining charge of the storage battery 30 further decreases to or below a predetermined level. In case that the remaining charge of the storage battery 30 decreases to or below the predetermined level when the consumption of electric power by the motor 32 is limited to the preset limit value, the storage battery 30 starts charging. In case that the remaining charge of the storage battery 30 is recovered to the level that is greater than the predetermined level but is less than the reference value Q0, the storage battery 30 can discharge a restricted amount of electric power.

Figure 8:
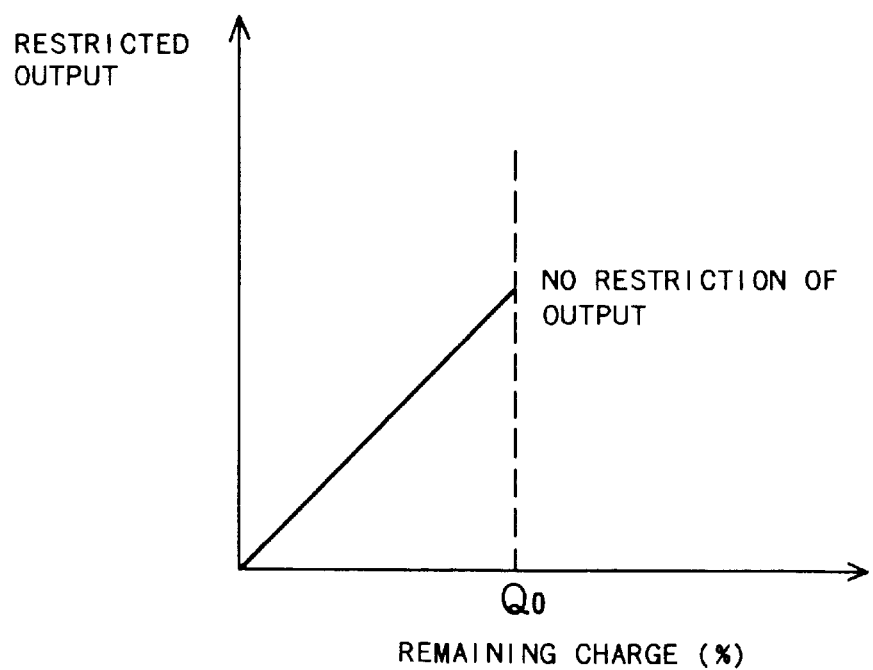
FIG. 8 shows a process of restricting the output according to the remaining charge of the storage battery 30.

The graph of FIG. 8 shows the case, in which the limit value for restricting the consumption of electric power by the motor 32 is set according to the remaining charge of the storage battery 30. Like the above procedure, the limit value is set to the electric power consumed by the motor 32 when the remaining charge Q of the storage battery 30 is less than the reference value Q0. In this case, however, the smaller limit value is set to the electric power consumed by the motor 32, with respect to the smaller remaining charge of the storage battery 30. When the remaining charge of the storage battery 30 becomes equal to or greater than the reference value Q0, such restriction is cancelled.

This structure limits the consumption of electric power when the remaining charge of the storage battery 30 becomes less than the reference value Q0, thereby protects the fuel cells 20 from excess loading. When the remaining charge of the storage battery 30 decreases to a certain extent, the output state of the storage battery 30 is changed from the discharging state to the charging state. This enables the remaining charge of the storage battery 30 to be recovered before decreasing to the critical level. The control procedure of FIG. 7 abruptly decreases the output to the motor 32 to a predetermined value in response to a decrease in remaining charge to a certain extent, and thus abruptly lowers the vehicle speed. The control procedure of FIG. 8, on the other hand, gradually decreases the output to the motor 32 and thus gradually lowers the vehicle speed. The latter control procedure is desirable for the driver of the vehicle.

Figure 9:
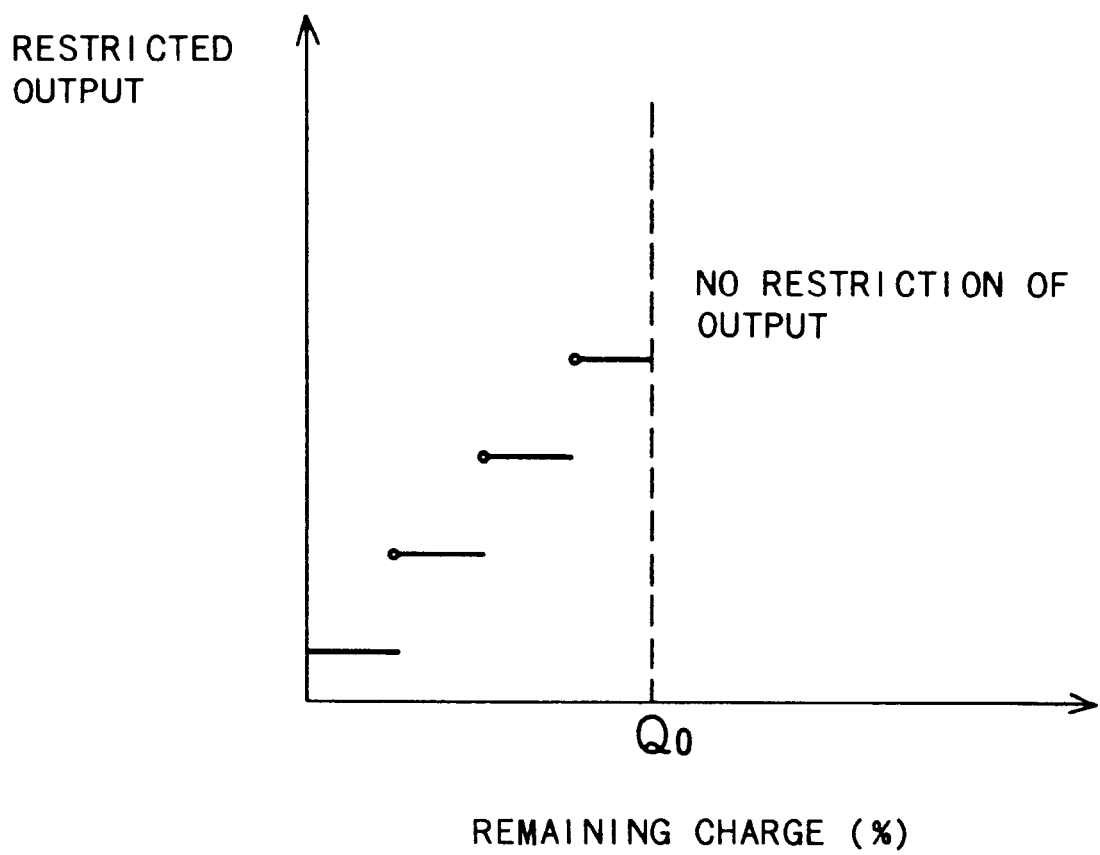
FIG. 9 shows a stepwise process of restricting the output according to the remaining charge of the storage battery 30.

The graph of FIG. 9 shows the case, in which the limit value for restricting the consumption of electric power by the motor 32 is set in a stepwise manner according to the remaining charge of the storage battery 30. Like the above procedure, the limit value is set to the electric power consumed by the motor 32 when the remaining charge Q of the storage battery 30 is less than the reference value Q0. In this case, however, the remaining charge of the storage battery 30 less than the reference value Q0 is divided into a plurality of stages (four stages in the example of FIG. 9), and different limit values are set for the respective stages. This structure enables the limit value of the consumption of electric power by the motor 32 to be regulated in response to the degree of decrease in remaining charge of the storage battery 30.

Any of the above control procedures shown in FIGS. 7 through 9 sets the output state of the storage battery 30 either in the dischargeable state or in the charging state based on the relationship between the limit value relating to the output of the storage battery 30 and the remaining charge of the storage battery 30, in case that the remaining charge of the storage battery 30 is less than the reference value Q0 and it is required to restrict the consumption of electric power by the motor 32. Like the structure of the first embodiment, the limit value, which has been once set to restrict the electric power consumed by the motor 32, may be reset to change the output state of the a storage battery 30 to the charging state. In this case, after setting the limit value of the consumption of electric power by the motor 32, the control procedure reads the output electric current of the storage battery 30 measured by the current sensor 90 and repeatedly decreases the limit value until the output electric current becomes negative. This structure enables the remaining charge of the storage battery 30 to be recovered quickly in case that the remaining charge of the storage battery 30 becomes less than the reference value Q0.

Another possible structure carries out any one of the output controls shown FIGS. 7 through 9 to restrict the consumption of electric power by the motor 32 when the remaining charge of the storage battery 30 decreases to be less than the reference value Q0, and repeatedly resets the limit value until the output state of the storage battery 30 is changed to the charging state like the first embodiment when the remaining charge of the storage battery 30 further decreases to be less than a predetermined second reference value. Any of the above structures changes the output state of the storage battery 30 to the charging state and thereby recovers the remaining charge of the storage battery 30, in case that the remaining charge of the storage battery 30 is reduced to a certain extent.

In any of the above structures, the limit value is set to restrict the electric power consumed by the storage battery 30. Another possible procedure stops operation of the motor 32 to restrict the consumption of electric power. The control unit 50 outputs a driving signal to the on/off switch 38 in the structure of FIG. 1, and the on/off switch 38 then disconnects the circuit, in order to cut a supply of electric power to the motor 32 and thereby stop the motor 32. The on/off switch 38 may be disposed in the circuit constituting the inverter 80.

This procedure can restrict the electric power consumed by the motor 32 through the control of cutting a supply of electric power to the motor 32 and stopping operation of the motor 32. One possible application selects the appropriate control procedure according to the degree of decrease in remaining charge of the storage battery 30 and the driving conditions of the vehicle, among the control of simply setting the limit value to the consumption of electric power by the motor 32, the control of setting the limit value to the output to the motor 32 in order to change the output state of the storage battery 30 to the charging state, and the control of stopping operation of the motor 32.

Figure 10:
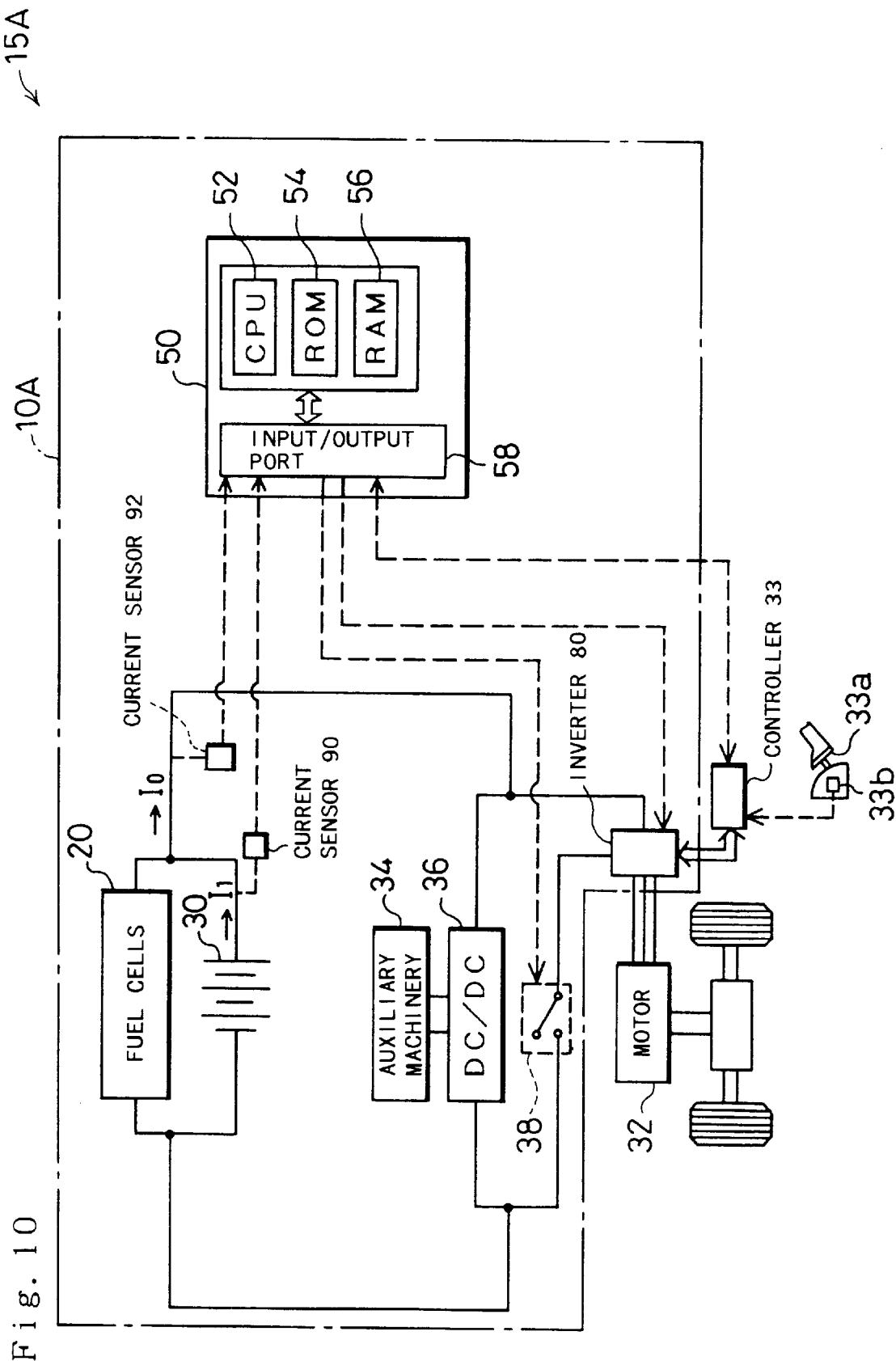
FIG. 10 is a block diagram illustrating structure of another electric vehicle 15A with a fuel-cells system 10A mounted thereon, as a second embodiment according to the present invention.

The fuel-cells system 10 of the first embodiment includes the remaining charge monitor 46 and the current sensor 90, and monitors the remaining charge of the storage battery 30 with the remaining charge monitor 46 while checking the sign of the output electric current of the storage battery 30 with the current sensor 90. Another possible structure does not have the remaining charge monitor 46, such as an SOC monitor, but uses only the current sensor 90 to detect the remaining charge of the storage battery 30. This structure is discussed below as a second embodiment according to the present invention. FIG. 10 is a block diagram illustrating structure of an electric vehicle 15A with a fuel-cells system 10A of the second embodiment mounted thereon. The electric vehicle 15A with the fuel-cells system 10A mounted thereon has similar structure to that of the electric vehicle 15 of the first embodiment shown in FIG. 1, except that the second embodiment includes a current sensor 92 in place of the remaining charge monitor 46, and is not specifically described here.

The fuel-cells system 10A has the second current sensor 92 in addition to the current sensor 90, which is included in the fuel-cells system 10 of the first embodiment. While the current sensor 90 measures output electric current I1 from the storage battery 30, the current sensor 92 measures overall electric current I0, which is the sum of the output electric current from the storage battery 30 and the output electric current from the fuel cells 20. Both the current sensors 90 and 92 are connected to the control unit 50 and output the observed electric currents to the control unit 50. The control unit 50 detects the remaining charge of the storage battery 30 based on the input data of the observed electric currents.

The following describes the principle of determining the remaining charge of the storage battery 30 based on the observed electric currents. The overall electric current I0, which flows through the circuit constituting the fuel-cells system 10A, satisfies the equation of I1+I2=I0, wherein I2 represents the output electric current from the fuel cells 20. In case that the storage battery 30 has the sufficient remaining charge and its output is not restricted, the storage battery 30 is discharged to output the electric power, which is expressed as I1>0. In this case, the inequality I2/I0<1 is satisfied. The value of I2/I0 becomes smaller with an increase in amount of the connected loading (see FIG. 4).

In case that the remaining charge of the storage battery 30 is not greater than a predetermined value and the connected loading (the required electric power of the motor 32) is smaller than a predetermined level, the fuel cells 20 charge the storage battery 30, which is expressed as I1<0. In this case, the inequality I2/I0>1 is satisfied. The value of I2/I0 gradually decreases and becomes closer to 1 with the progress of charging of the storage battery 30 by the fuel cells 20.

The value of I2/I0 depends upon the remaining charge of the storage battery 30 and the amount of the connected loading. The value of I2/I0 can be determined corresponding to the loading of a known amount at the remaining charge of the storage battery 30 equal to the reference value Q0. In the fuel-cells system 10A of the embodiment, the values of I2/I0 over the range of expected amount of loading (the total of required electric power of the motor 32 and the auxiliary machinery 34) at the remaining charge of the storage battery 30 equal to the reference value Q0 are stored in advance in the control unit 50. This enables the output state of the storage battery 30 to be determined according to the output electric currents from the storage battery 30 and the fuel cells 20.

Figure 11:
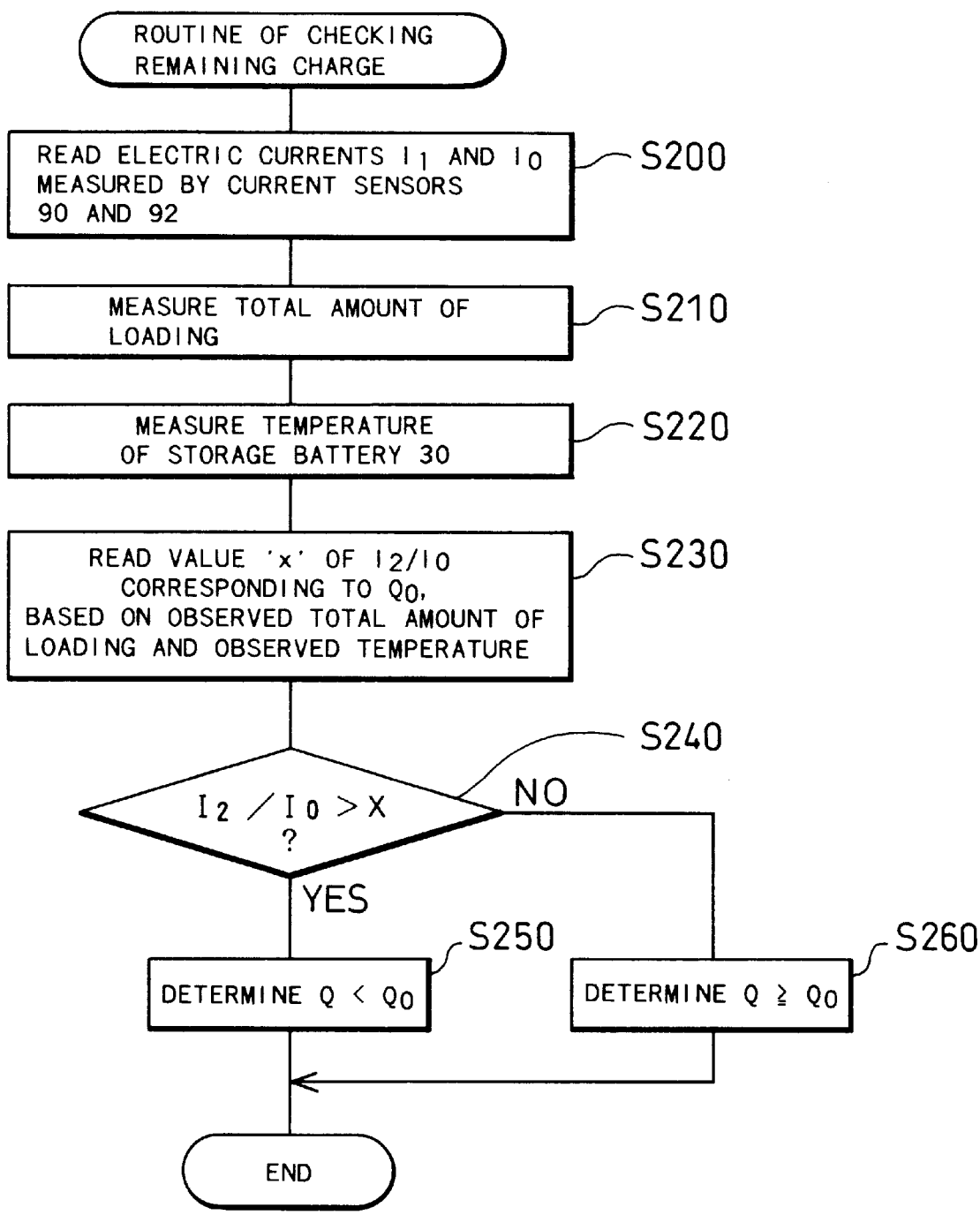
FIG. 11 is a flowchart showing a routine of checking the remaining charge executed in the fuel-cells system 10A of the second embodiment to detect the remaining charge of the storage battery 30.

The value of I2/I0 is also varied with the temperature of the storage battery 30. The values of I2/I0 over the range of expected operating temperature of the storage battery 30 at the remaining charge of the storage battery 30 equal to the reference value Q0 are stored in the form of a map in the control unit 50. FIG. 11 is a flowchart showing a routine of checking the remaining charge executed by the CPU 52 to detect the remaining charge of the storage battery 30 in the fuel-cells system 10A. The routine of checking the remaining charge is carried out in place of the processing of steps S100 and S110 in the control routine under the condition of reduced remaining charge executed in the fuel-cells system 10 of the first embodiment.

When the program enters the routine of FIG. 11, the CPU 52 first reads data of the electric currents I1 and I0 measured by the current sensors 90 and 92 at step S200 and then reads the total amount of loading at step S210. The total amount of loading is obtained by reading the driving conditions of the motor 32 and the auxiliary machinery 34. The CPU 52 subsequently measures the temperature of the storage battery 30 with a temperature sensor (not shown) at step S220.

At step S230, the CPU 52 determines a value 'x' of I2/I0 at the remaining charge of the storage battery 30 equal to the reference value Q0, based on the observed total amount of loading and the observed temperature of the storage battery 30. The CPU 52 then calculates the value of I2/I0 from the observed electric currents I1 and I0 read at step S200 and compares the value of I2/I0 with the value VXV based on the reference value Q0 at step S240. When the value of I2/I0 based on the observed electric currents is greater than the value 'x', the program determines that the remaining charge Q of the storage battery 30 is less than the reference value Q0 at step S250 and exits from this routine. The program then proceeds to step S120 to restrict the consumption of electric power by the motor 32, in the control routine under the condition of reduced remaining charge shown in the flowchart of FIG. 6. When the value of I2/I0 based on the observed electric currents is not greater than the value 'x', on the other hand, the program determines that the remaining charge Q of the storage battery 30 is not less than the reference value Q0 at step S260, and exits from both this routine and the control routine under the condition of reduced remaining charge.

In the fuel-cells system 10A of the second embodiment that determines the remaining charge of the storage battery 30 based on the observed electric currents, the processing of steps S150 and S160 in the control routine under the condition of reduced remaining charge shown in the flowchart of FIG. 6 is also replaced by the similar processing. The CPU 52 reads the value of I2/I0 corresponding to the reference value Q1 instead of the reference value Q0 from a predetermined map stored in the control unit 50, based on the observed total amount of loading and the observed temperature of the storage battery 30, and compares the value of I2/I0 based on the observed electric currents with the value of I2/I0 based on the reference value Q1.

In the second embodiment discussed above, the output electric current I1 of the storage battery 30 and the overall electric current I0 are measured with the current sensors 90 and 92. The output electric current I2 of the fuel cells 20 may, however, be measured instead of I1 or I0. Since the other electric current (for example, I2) can be calculated from the observed two electric currents (for example, I0 and I1), measurement is required for at least two of the electric current I1, I0, and I2.

The fuel-cells system 10A of the second embodiment does not require the remaining charge monitor 46, which is attached to the storage battery 30 to measure the remaining charge of the storage battery 30 in the first embodiment. This simplifies the structure of the whole system. The structure of the second embodiment with two simple current sensors can detect the remaining charge of the storage battery 30 and monitor the charge-discharge state of the storage battery 30.

The fuel-cells system 10A of the second embodiment measures at least two among the output electric current I1 from the storage battery 30, the output electric current I2 from the fuel cells 20, and the overall electric current I0, and determines the remaining charge of the storage battery 30 based on the observed electric currents. Another possible structure determines the remaining charge of the storage battery 30, based on the output electric current I1 from the storage battery 30 and the voltage in the circuit constituting the fuel-cells system 10A. Such a structure is discussed below as a third embodiment according to the present invention.

Figure 12:
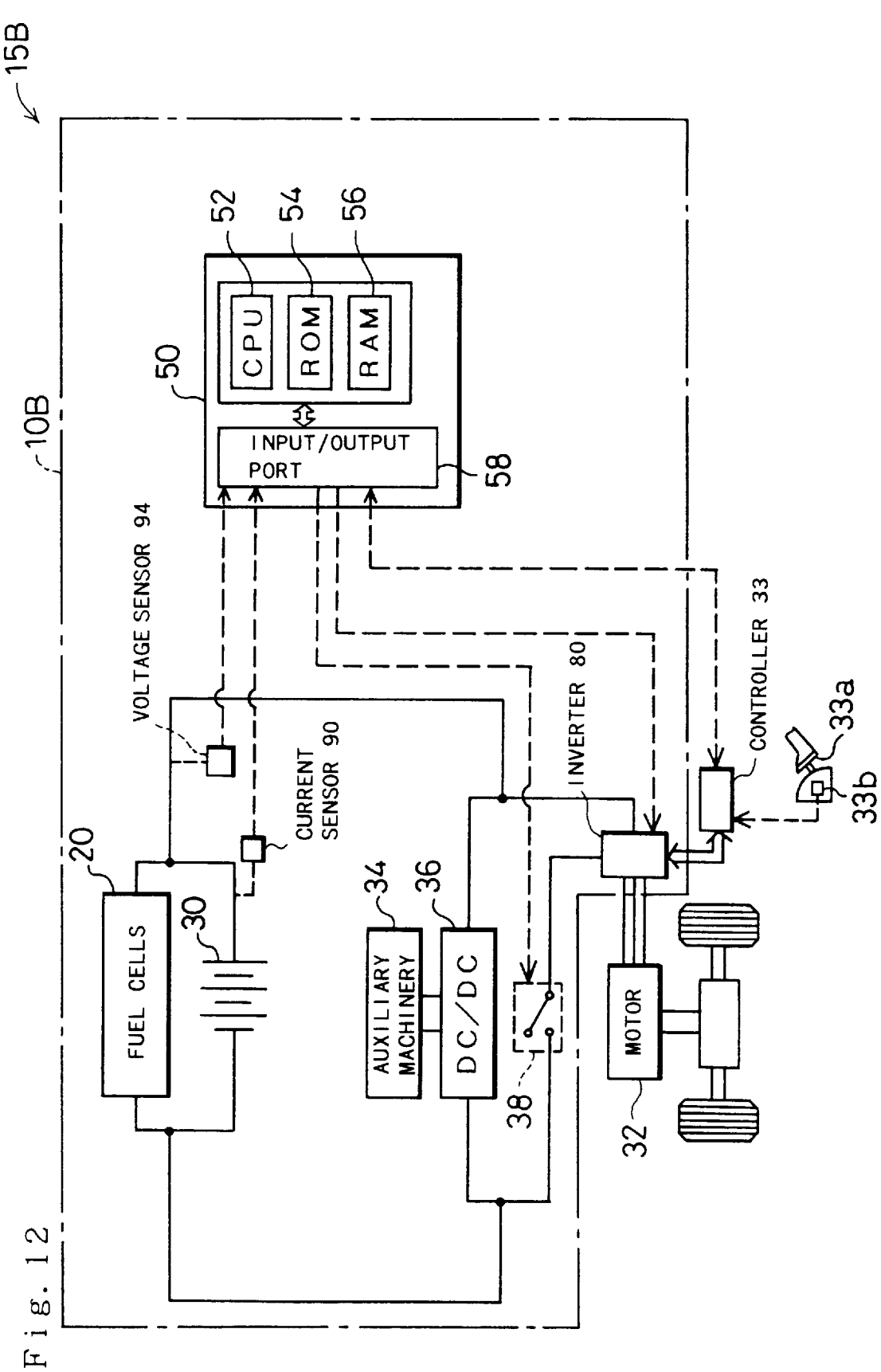
FIG. 12 is a block diagram illustrating structure of still another electric vehicle 15B with a fuel-cells system 10B mounted thereon, as a third embodiment according to the present invention.

FIG. 12 is a block diagram illustrating an electric vehicle 15B with a fuel-cells system 10B of the third embodiment mounted thereon. The electric vehicle 15B with the fuel-cells system 10B mounted thereon has similar structure to those of the electric vehicle 15 of the first embodiment shown in FIG. 1 and of the electric vehicle 15A of the second embodiment shown in FIG. 10, except that the third embodiment includes a voltage sensor 94 in place of the remaining charge monitor 46 or the current sensor 92, and is not specifically described here.

The fuel-cells system 10B has the voltage sensor 94 in addition to the current sensor 90, which is included in the fuel-cells systems 10 and 10A of the first and the second embodiments. Since the fuel cells 20 and the storage battery 30 are connected parallel to each other, the voltage measured by the voltage sensor 94 represents the output voltage of the fuel cells 20 and the output voltage of the storage battery 30. The voltage sensor 94 is connected to the control unit 50 and outputs the observed voltage to the control unit 50. The control unit 50 detects the remaining charge of the storage battery 30, based on the input data of the voltage measured by the voltage sensor 94 and the electric current measured by the current sensor 90.

Figure 13:
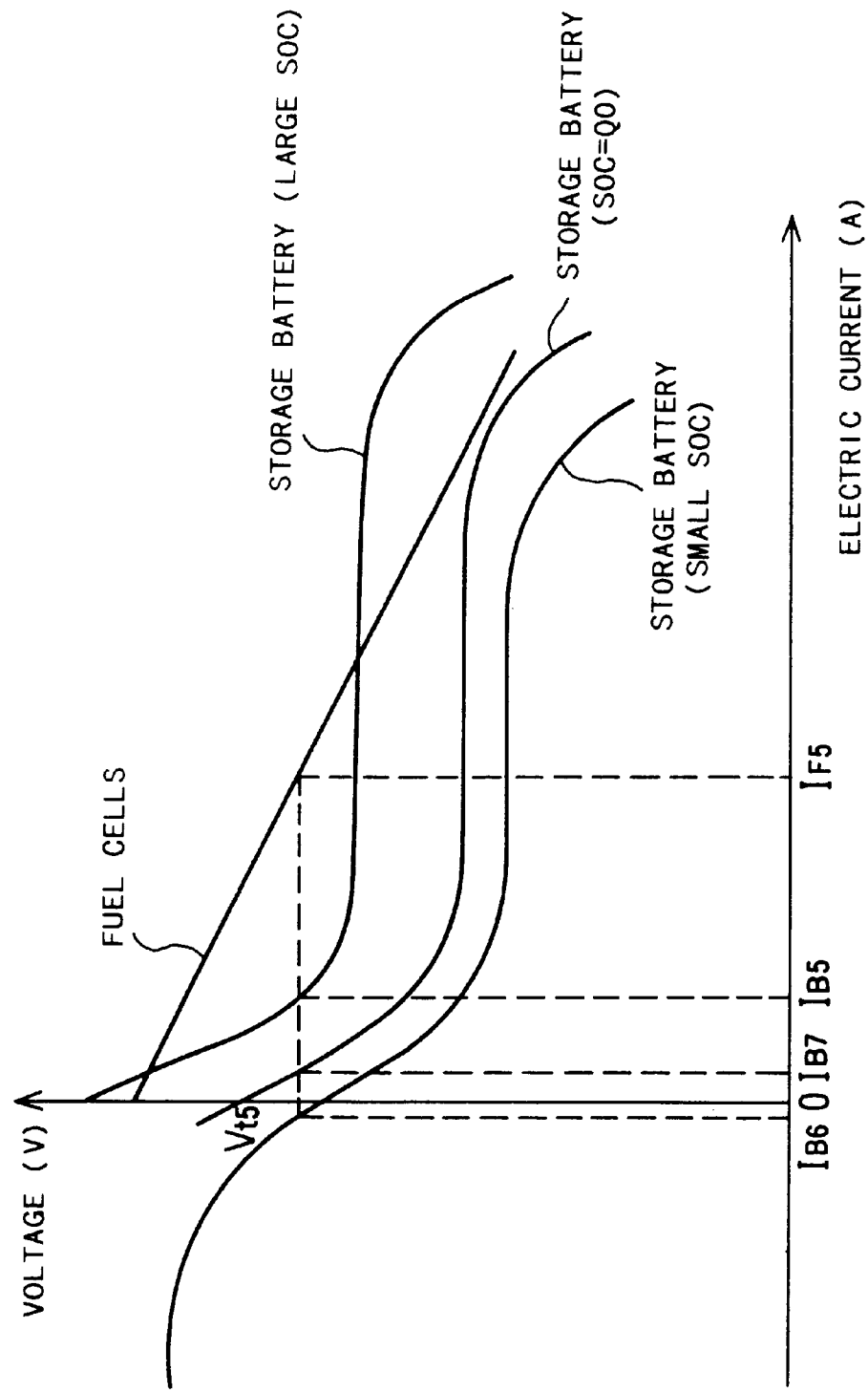
FIG. 13 is a graph showing output characteristics of the fuel cells 30 and the storage battery 30 in various charge states.

The following describes the principle of determining the remaining charge of the storage battery 30 based on the observed voltage and electric current. FIG. 13 is a graph schematically showing the output characteristics of the fuel cells 20 and the storage battery 30 in the sufficient charge state (for example, 90%), in the insufficient charge state (for example, 20%), and having the remaining charge equal to the reference value Q0. With respect to a specific voltage measured by the voltage sensor 94, the output electric current from the storage battery 30 is determined unequivocally corresponding to the remaining charge thereof. By way of example, when Vt5 represents the observed voltage, the output electric current from the storage battery 30 is equal to IB5 at the 90% remaining charge of the storage battery 30, equal to IB6 at the 20% remaining charge, and equal to IB7 at the remaining charge of the reference value Q0.

In the fuel-cells system 10B of the third embodiment, the output characteristics of the storage battery 30 at the remaining charge of the storage battery 30 equal to the reference value Q0 are stored in the control unit 50. The control unit 50 receives data of the observed output electric current I1 of the storage battery 30 and the observed voltage V and compares the observed electric current I1 with a value of output electric current IBQ of the storage battery 30 at the voltage V and the remaining charge of the storage battery 30 equal to the reference value Q0. When I1>IBQ, it is determined that the remaining charge of the storage battery 30 is greater than the reference value Q0. When I1<IBQ, on the other hand, it is determined that the remaining charge of the storage battery 30 is less than the reference value Q0.

Figure 14:
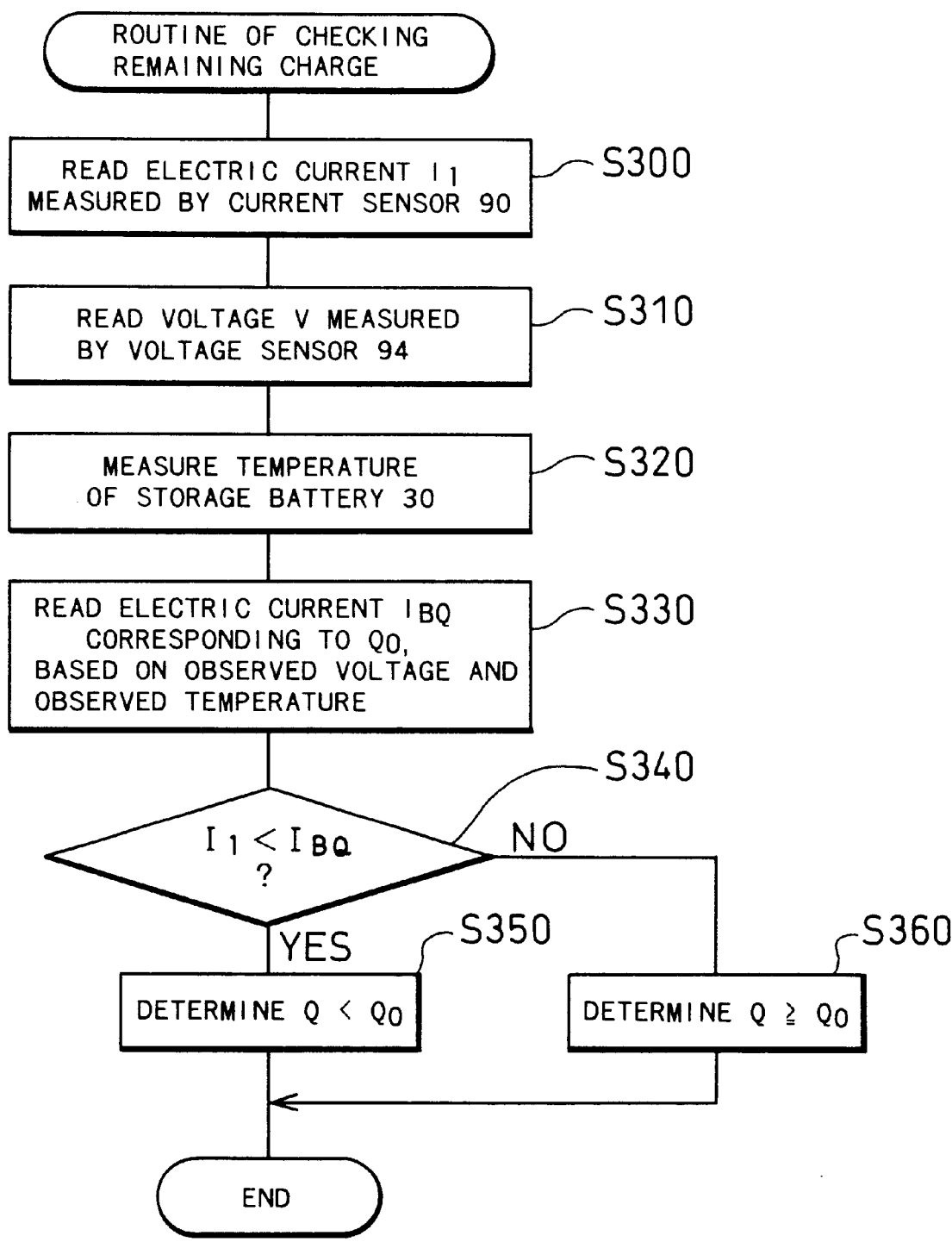
FIG. 14 is a flowchart showing a routine of checking the remaining charge executed in the fuel-cells system 10B of the third embodiment to detect the remaining charge of the storage battery 30.

The output characteristics of the storage battery 30 at the remaining charge of the storage battery 30 equal to the reference value Q0 also depend upon the temperature of the storage battery 30. The output characteristics of the storage battery 30 over the range of expected operating temperature of the storage battery 30 at the remaining charge of the storage battery 30 equal to the reference value Q0 are thus stored in the control unit 50. FIG. 14 is a flowchart showing a routine of checking the remaining charge executed by the CPU 52 to detect the remaining charge of the storage battery 30 in the fuel-cells system 10B. The routine of checking the remaining charge is carried out in place of the processing of steps S100 and S110 in the control routine under the condition of reduced remaining charge executed in the fuel-cells system 10 of the first embodiment.

When the program enters the routine of FIG. 14, the CPU 52 reads the electric current I1 measured by the current sensor 90 at step S300, reads the voltage V measured by the voltage sensor 94 at step S310, and reads the temperature of the storage battery 30 measured by a temperature sensor (not shown) at step S320. The program then proceeds to step S330 to read the output electric current IBQ of the storage battery 30 at the remaining charge of the storage battery 30 equal to the reference value Q0, based on the observed voltage and the observed temperature of the storage battery 30. At subsequent step S340, the value of output electric current IBQ is compared with the observed electric current I1 read at step S300. In case that the calculated electric current IBQ based on the remaining charge Q0 of the storage battery 30 is greater than the observed electric current It, the program determines that the remaining charge Q of the storage battery 30 is less than the reference value Q0 at step S350 and exits from this routine. In case that the calculated electric current IBQ based on the remaining charge Q0 of the storage battery 30 is not greater than the observed electric current I1, on the other hand, the program determines that the remaining charge Q of the storage battery 30 is not less than the reference value Q0 at step S360 and exits from both this routine and the control routine under the condition of reduced remaining charge.

In the fuel-cells system 10B of the third embodiment that determines the remaining charge of the storage battery 30 based on the observed electric current and voltage, the processing of steps S150 and S160 in the control routine under the condition of reduced remaining charge shown in the flowchart of FIG. 6 is also replaced by the similar processing. The CPU 52 reads the electric current IBQ of the storage battery 30 corresponding to the reference value Q1 instead of the reference value Q0 from a predetermined map stored in the control unit 50, based on the observed voltage and the observed temperature of the storage battery 30, and compares the calculated electric current IBQ with the observed electric current I1.

Like the second embodiment, the fuel-cells system 10B of the third embodiment does not require the remaining charge monitor 46, which is attached to the storage battery 30 to measure the remaining charge of the storage battery 30 in the first embodiment. This simplifies the structure of the whole system. The structure of the third embodiment with simple current sensor and voltage sensor can detect the remaining charge of the storage battery 30 and monitor the charge-discharge state of the storage battery 30.

In the first through the third embodiments discussed above, the control unit 50 outputs a driving signal to the inverter 80 and regulates the amplitude and the frequency of the three-phase alternating current supplied from the inverter 80 to the motor 32, in order to reduce the consumption of electric power by the motor 32 and limit the output from the storage battery 30. This structure does not require any special circuit, but can readily reduce the electric power consumed by the motor 32 through transmission of electrical signals. Another possible application uses a resistance of a predetermined intensity, which is disposed at a predetermined position in the circuit including the motor 32 and is connectable through a switching operation of a contact. This modified structure increases the resistance in the whole circuit by switching the contact, thereby restricting the electric power consumed by the motor 32.

The first through the third embodiments regard the control of the output to the motor 32, which is carried out when the remaining charge of the storage battery 30 is lowered. In the actual electric vehicle, when the driver steps on the accelerator pedal 33a, such control prevents an increase in vehicle speed, lowers the vehicle speed, or even stops the vehicle. A preferable structure accordingly informs the driver of the state under the output control by lighting a predetermined alarm lamp or giving a sound alarm or an alarm beep, when the remaining charge of the storage battery 30 is lowered and the output to the motor 32 is restricted. Such information prevents the driver from mistakenly considering the state of output control as a malfunction of the vehicle and ensures the safety driving under the conditions of output control.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A fuel-cells system comprising a stack of fuel cells and a storage battery connected parallel to each other and to a loading and giving a supply of electric power from said stack of fuel cells and said storage battery to said loading, said fuel-cells system comprising:

remaining charge detection means for detecting a remaining charge of said storage battery; and output control means for, when said detected remaining charge of said storage battery is less than a predetermined level, restricting the supply of electric power to said loading.

2. A fuel-cells system in accordance with claim 1, said fuel-cells system connected to a plurality of loads included in said loading, wherein said output control means cuts the supply of electric power to at least one load among said plurality of loads and thereby restricts the supply of electric power to said loading.

3. A fuel-cells system in accordance with claim 1, wherein said output control means limits the supply of electric power to said loading to a predetermined value, in order to enable said stack of fuel cells to charge said storage battery.

4. A fuel-cells system in accordance with claim 1, wherein said remaining charge detection means comprises:

electric current measurement means for measuring at least two electric currents selected among a fuel-cells current output from said stack of fuel cells, a storage battery current output from said storage battery, and an overall electric current, which is a sum of said fuel-cells current and said storage battery current; and means for detecting the remaining charge of said storage battery based on said at least two electric currents measured by said electric current measurement means.

5. A fuel-cells system in accordance with claim 2, wherein said remaining charge detection means comprises:

electric current measurement means for measuring at least two electric currents selected among a fuel-cells current output from said stack of fuel cells, a storage battery current output from said storage battery, and an overall electric current, which is a sum of said fuel-cells current and said storage battery current; and means for detecting the remaining charge of said storage battery based on said at least two electric currents measured by said electric current measurement means.

6. A fuel-cells system in accordance with claim 3, wherein said remaining charge detection means comprises:

electric current measurement means for measuring at least two electric currents selected among a fuel-cells current output from said stack of fuel cells, a storage battery current output from said storage battery, and an overall electric current, which is a sum of said fuel-cells current and said storage battery current; and means for detecting the remaining charge of said storage battery based on said at least two electric currents measured by said electric current measurement means.

7. A fuel-cells system in accordance with claim 1, wherein said remaining charge detection means comprises:

current measurement means for measuring a storage battery current output from said storage battery;

voltage measurement means for measuring a voltage in said fuel-cells system; and means for detecting the remaining charge of said storage battery based on said storage battery current measured by said current measurement means and said voltage measured by said voltage measurement means.

8. A fuel-cells system in accordance with claim 2, wherein said remaining charge detection means comprises:

current measurement means for measuring a storage battery current output from said storage battery;

voltage measurement means for measuring a voltage in said fuel-cells system; and means for detecting the remaining charge of said storage battery based on said storage battery current measured by said current measurement means and said voltage measured by said voltage measurement means.

9. A fuel-cells system in accordance with claim 3, wherein said remaining charge detection means comprises:

current measurement means for measuring a storage battery current output from said storage battery;

voltage measurement means for measuring a voltage in said fuel-cells system; and means for detecting the remaining charge of said storage battery based on said storage battery current measured by said current measurement means and said voltage measured by said voltage measurement means.

10. An electric vehicle having a motor rotated by electrical energy and means for transmitting a rotational force of said motor to an axle, thereby producing a driving force for said vehicle, said electric vehicle having a fuel-cells system mounted thereon, said power supply system comprising a stack of fuel cells and a storage battery connected parallel to each other and to said motor and giving a supply of electric power from said stack of fuel cells and said storage battery to said motor, said fuel-cells system comprising:

remaining charge detection means for detecting a remaining charge of said storage battery; and output control means for, when the remaining charge of said storage battery detected by said remaining charge detection means is less than a predetermined level, restricting the supply of electric power to said motor.

11. An electric vehicle in accordance with claim 10, wherein said output control means controls operation of said motor, thereby restricting the supply of electric power to said motor.

12. A method of controlling the supply of electric power to said loading, using a fuel-cells system comprising a stack of fuel cells and a storage battery connected parallel to each other and to said loading and giving a supply of electric power from said stack of fuel cells and said storage battery to said loading, said method comprising the steps of:

(a) detecting a remaining charge of said storage battery; and (b) restricting the supply of electric power to said loading when the remaining charge of said storage battery detected in said step (a) is not greater than a predetermined level.

13. A method in accordance with claim 12, wherein said step (b) comprises the step of:

cutting the supply of electric power to at least one load among a plurality of loads included in said loading, and thereby restricting the supply of electric power to said loading.

14. A method in accordance with claim 12, wherein said step (b) comprises the step of:

limiting the supply of electric power to said loading to a predetermined value, in order to enable said stack of fuel cells to charge said storage battery.

15. A method in accordance with claim 12, wherein said step (a) comprises the steps of:

(a-1) measuring at least two electric currents selected among a fuel-cells current output from said stack of fuel cells, a storage battery current output from said storage battery, and an overall electric current, which is a sum of said fuel-cells current and said storage battery current; and (a-2) detecting the remaining charge of said storage battery based on said at least two electric currents measured in said step (a-1).

16. A method in accordance with claim 12, wherein said step (a) comprises the steps of:

(a-11) measuring a storage battery current output from said storage battery;

(a-12) measuring a voltage in said fuel-cells system; and (a-13) detecting the remaining charge of said storage battery based on said storage battery current measured in said step (a-11) and said voltage measured in said step (a-12).

* * * * *